United States Patent
Neudecker et al.

(10) Patent No.: US 8,518,581 B2
(45) Date of Patent: Aug. 27, 2013

(54) THIN FILM ENCAPSULATION FOR THIN FILM BATTERIES AND OTHER DEVICES

(75) Inventors: Bernd J. Neudecker, Littleton, CO (US); Shawn W. Snyder, Golden, CO (US)

(73) Assignee: Inifinite Power Solutions, Inc., Littleton, CO (US)

( * ) Notice: Subject to any disclaimer, the term of this patent is extended or adjusted under 35 U.S.C. 154(b) by 1216 days.

(21) Appl. No.: 12/351,137

(22) Filed: Jan. 9, 2009

(65) Prior Publication Data

US 2009/0181303 A1 Jul. 16, 2009

Related U.S. Application Data

(60) Provisional application No. 61/020,506, filed on Jan. 11, 2008.

(51) Int. Cl.
*H01M 4/02* (2006.01)
*H01M 2/08* (2006.01)

(52) U.S. Cl.
USPC .......................................... 429/209; 429/185

(58) Field of Classification Search
USPC ................................................ 429/185, 209
See application file for complete search history.

(56) References Cited

U.S. PATENT DOCUMENTS

| | | | |
|---|---|---|---|
| 712,316 | A | 10/1902 | Loppe et al. |
| 2,970,180 | A | 1/1961 | Urry |
| 3,309,302 | A | 3/1967 | Heil |
| 3,616,403 | A | 10/1971 | Collins et al. |
| 3,790,432 | A | 2/1974 | Fletcher et al. |
| 3,797,091 | A | 3/1974 | Gavin |
| 3,850,604 | A | 11/1974 | Klein |
| 3,939,008 | A | 2/1976 | Longo et al. |
| 4,082,569 | A | 4/1978 | Evans, Jr. |
| 4,111,523 | A | 9/1978 | Kaminow et al. |
| 4,127,424 | A | 11/1978 | Ullery, Jr. |
| 4,226,924 | A | 10/1980 | Kimura et al. |
| 4,283,216 | A | 8/1981 | Brereton |
| 4,318,938 | A | 3/1982 | Barnett et al. |

(Continued)

FOREIGN PATENT DOCUMENTS

| CN | 1415124 | 4/2003 |
|---|---|---|
| CN | 1532984 | 9/2004 |

(Continued)

OTHER PUBLICATIONS

Belkind, A. et al., "Pulsed-DC Reactive Sputtering of Dielectrics: Pulsing Parameter Effects," 43$^{rd}$ Annual Technical Conference Proceedings (2000).

(Continued)

*Primary Examiner* — Patrick Ryan
*Assistant Examiner* — Muhammad Siddiquee
(74) *Attorney, Agent, or Firm* — Jeff E. Schwartz; Fox Rothschild LLP

(57) ABSTRACT

An electrochemical device is claimed and disclosed, including a method of manufacturing the same, comprising an environmentally sensitive material, such as, for example, a lithium anode; and a plurality of alternating thin metallic and ceramic, blocking sub-layers. The multiple metallic and ceramic, blocking sub-layers encapsulate the environmentally sensitive material. The device may include a stress modulating layer, such as for example, a Lipon layer between the environmentally sensitive material and the encapsulation layer.

27 Claims, 1 Drawing Sheet

(56) References Cited

U.S. PATENT DOCUMENTS

| | | |
|---|---|---|
| 4,328,297 A | 5/1982 | Bilhorn |
| 4,395,713 A | 7/1983 | Nelson et al. |
| 4,437,966 A | 3/1984 | Hope et al. |
| 4,442,144 A | 4/1984 | Pipkin |
| 4,467,236 A | 8/1984 | Kolm et al. |
| 4,481,265 A | 11/1984 | Ezawa et al. |
| 4,518,661 A | 5/1985 | Rippere |
| 4,555,456 A | 11/1985 | Kanehori et al. |
| 4,572,873 A | 2/1986 | Kanehori et al. |
| 4,587,225 A | 5/1986 | Tsukuma et al. |
| 4,619,680 A | 10/1986 | Nourshargh et al. |
| 4,645,726 A | 2/1987 | Hiratani et al. |
| 4,664,993 A | 5/1987 | Sturgis et al. |
| 4,668,593 A | 5/1987 | Sammells |
| RE32,449 E | 6/1987 | Claussen |
| 4,672,586 A | 6/1987 | Shimohigashi et al. |
| 4,710,940 A | 12/1987 | Sipes, Jr. |
| 4,728,588 A | 3/1988 | Noding et al. |
| 4,740,431 A | 4/1988 | Little |
| 4,756,717 A | 7/1988 | Sturgis et al. |
| 4,785,459 A | 11/1988 | Baer |
| 4,826,743 A | 5/1989 | Nazri |
| 4,865,428 A | 9/1989 | Corrigan |
| 4,878,094 A | 10/1989 | Balkanski |
| 4,903,326 A | 2/1990 | Zakman et al. |
| 4,915,810 A | 4/1990 | Kestigian et al. |
| 4,964,877 A | 10/1990 | Keister et al. |
| 4,977,007 A | 12/1990 | Kondo et al. |
| 4,978,437 A | 12/1990 | Wirz |
| 5,006,737 A | 4/1991 | Fay |
| 5,019,467 A | 5/1991 | Fujiwara |
| 5,030,331 A | 7/1991 | Sato |
| 5,035,965 A | 7/1991 | Sangyoji et al. |
| 5,055,704 A | 10/1991 | Link et al. |
| 5,057,385 A | 10/1991 | Hope et al. |
| 5,085,904 A | 2/1992 | Deak et al. |
| 5,096,852 A | 3/1992 | Hobson |
| 5,100,821 A | 3/1992 | Fay |
| 5,107,538 A | 4/1992 | Benton et al. |
| 5,110,694 A | 5/1992 | Nagasubramanian et al. |
| 5,110,696 A | 5/1992 | Shokoohi et al. |
| 5,119,269 A | 6/1992 | Nakayama |
| 5,119,460 A | 6/1992 | Bruce et al. |
| 5,124,782 A | 6/1992 | Hundt et al. |
| 5,147,985 A | 9/1992 | DuBrucq |
| 5,153,710 A | 10/1992 | McCain |
| 5,169,408 A | 12/1992 | Biggerstaff et al. |
| 5,171,413 A | 12/1992 | Arntz et al. |
| 5,173,271 A | 12/1992 | Chen et al. |
| 5,174,876 A | 12/1992 | Buchal et al. |
| 5,180,645 A | 1/1993 | Moré |
| 5,187,564 A | 2/1993 | McCain |
| 5,196,041 A | 3/1993 | Tumminelli et al. |
| 5,196,374 A | 3/1993 | Hundt et al. |
| 5,200,029 A | 4/1993 | Bruce et al. |
| 5,202,201 A | 4/1993 | Meunier et al. |
| 5,206,925 A | 4/1993 | Nakazawa et al. |
| 5,208,121 A | 5/1993 | Yahnke et al. |
| 5,217,828 A | 6/1993 | Sangyoji et al. |
| 5,221,891 A | 6/1993 | Janda et al. |
| 5,225,288 A | 7/1993 | Beeson et al. |
| 5,227,264 A | 7/1993 | Duval et al. |
| 5,237,439 A | 8/1993 | Misono et al. |
| 5,252,194 A | 10/1993 | Demaray et al. |
| 5,262,254 A | 11/1993 | Koksbang et al. |
| 5,273,608 A | 12/1993 | Nath |
| 5,287,427 A | 2/1994 | Atkins et al. |
| 5,296,089 A | 3/1994 | Chen et al. |
| 5,300,461 A | 4/1994 | Ting |
| 5,302,474 A | 4/1994 | Shackle |
| 5,303,319 A | 4/1994 | Ford et al. |
| 5,306,569 A | 4/1994 | Hiraki |
| 5,307,240 A | 4/1994 | McMahon |
| 5,309,302 A | 5/1994 | Vollmann |
| 5,314,765 A | 5/1994 | Bates |
| 5,326,652 A | 7/1994 | Lake |
| 5,326,653 A | 7/1994 | Chang |
| 5,338,624 A | 8/1994 | Gruenstern et al. |
| 5,338,625 A | 8/1994 | Bates et al. |
| 5,342,709 A | 8/1994 | Yahnke et al. |
| 5,355,089 A | 10/1994 | Treger et al. |
| 5,360,686 A | 11/1994 | Peled et al. |
| 5,362,579 A | 11/1994 | Rossoll et al. |
| 5,381,262 A | 1/1995 | Arima et al. |
| 5,387,482 A | 2/1995 | Anani |
| 5,401,595 A | 3/1995 | Kagawa et al. |
| 5,403,680 A | 4/1995 | Otagawa et al. |
| 5,411,537 A | 5/1995 | Munshi et al. |
| 5,411,592 A | 5/1995 | Ovshinsky et al. |
| 5,419,982 A | 5/1995 | Tura et al. |
| 5,427,669 A | 6/1995 | Drummond |
| 5,435,826 A | 7/1995 | Sakakibara et al. |
| 5,437,692 A | 8/1995 | Dasgupta et al. |
| 5,445,856 A | 8/1995 | Chaloner-Gill |
| 5,445,906 A | 8/1995 | Hobson et al. |
| 5,448,110 A | 9/1995 | Tuttle et al. |
| 5,449,576 A | 9/1995 | Anani |
| 5,455,126 A | 10/1995 | Bates et al. |
| 5,457,569 A | 10/1995 | Liou et al. |
| 5,458,995 A | 10/1995 | Behl et al. |
| 5,464,692 A | 11/1995 | Huber |
| 5,464,706 A | 11/1995 | Dasgupta et al. |
| 5,470,396 A | 11/1995 | Mongon et al. |
| 5,472,795 A | 12/1995 | Atita |
| 5,475,528 A | 12/1995 | LaBorde |
| 5,478,456 A | 12/1995 | Humpal et al. |
| 5,483,613 A | 1/1996 | Bruce et al. |
| 5,493,177 A | 2/1996 | Muller et al. |
| 5,498,489 A | 3/1996 | Dasgupta et al. |
| 5,499,207 A | 3/1996 | Miki et al. |
| 5,501,918 A | 3/1996 | Gruenstern et al. |
| 5,504,041 A | 4/1996 | Summerfelt |
| 5,512,147 A | 4/1996 | Bates et al. |
| 5,512,387 A | 4/1996 | Ovshinsky |
| 5,512,389 A | 4/1996 | Dasgupta et al. |
| 5,538,796 A | 7/1996 | Schaffer et al. |
| 5,540,742 A | 7/1996 | Sangyoji et al. |
| 5,547,780 A | 8/1996 | Kagawa et al. |
| 5,547,782 A | 8/1996 | Dasgupta et al. |
| 5,552,242 A | 9/1996 | Ovshinsky et al. |
| 5,555,127 A | 9/1996 | Abdelkader et al. |
| 5,561,004 A | 10/1996 | Bates et al. |
| 5,563,979 A | 10/1996 | Bruce et al. |
| 5,565,071 A | 10/1996 | Demaray et al. |
| 5,567,210 A | 10/1996 | Bates et al. |
| 5,569,520 A | 10/1996 | Bates |
| 5,582,935 A | 12/1996 | Dasgupta et al. |
| 5,591,520 A | 1/1997 | Migliorini et al. |
| 5,597,660 A | 1/1997 | Bates et al. |
| 5,597,661 A | 1/1997 | Takeuchi et al. |
| 5,599,355 A | 2/1997 | Nagasubramanian et al. |
| 5,601,952 A | 2/1997 | Dasgupta et al. |
| 5,603,816 A | 2/1997 | Demaray et al. |
| 5,607,560 A | 3/1997 | Hirabayashi et al. |
| 5,607,789 A | 3/1997 | Treger et al. |
| 5,612,152 A | 3/1997 | Bates et al. |
| 5,612,153 A | 3/1997 | Moulton et al. |
| 5,613,995 A | 3/1997 | Bhandarkar et al. |
| 5,616,933 A | 4/1997 | Li |
| 5,618,382 A | 4/1997 | Mintz et al. |
| 5,625,202 A | 4/1997 | Chai |
| 5,637,418 A | 6/1997 | Brown et al. |
| 5,643,480 A | 7/1997 | Gustavsson et al. |
| 5,644,207 A | 7/1997 | Lew et al. |
| 5,645,626 A | 7/1997 | Edlund et al. |
| 5,645,960 A | 7/1997 | Scrosati et al. |
| 5,654,054 A | 8/1997 | Tropsha et al. |
| 5,654,984 A | 8/1997 | Hershbarger et al. |
| 5,658,652 A | 8/1997 | Sellergren |
| 5,660,700 A | 8/1997 | Shimizu et al. |
| 5,665,490 A | 9/1997 | Takeuchi et al. |
| 5,667,538 A | 9/1997 | Bailey |
| 5,677,784 A | 10/1997 | Harris |
| 5,679,980 A | 10/1997 | Summerfelt |

| | | | | | | |
|---|---|---|---|---|---|---|
| 5,681,666 | A | 10/1997 | Treger et al. | 6,030,421 A | 2/2000 | Gauthier et al. |
| 5,686,360 | A | 11/1997 | Harvey, III et al. | 6,033,768 A | 3/2000 | Muenz et al. |
| 5,689,522 | A | 11/1997 | Beach | 6,042,965 A | 3/2000 | Nestler et al. |
| 5,693,956 | A | 12/1997 | Shi et al. | 6,045,626 A | 4/2000 | Yano et al. |
| 5,702,829 | A | 12/1997 | Paidassi et al. | 6,045,652 A | 4/2000 | Tuttle et al. |
| 5,705,293 | A | 1/1998 | Hobson | 6,045,942 A | 4/2000 | Miekka et al. |
| 5,716,728 | A | 2/1998 | Smesko | 6,046,081 A | 4/2000 | Kuo |
| 5,718,813 | A | 2/1998 | Drummond et al. | 6,046,514 A | 4/2000 | Rouillard et al. |
| 5,719,976 | A | 2/1998 | Henry et al. | 6,048,372 A | 4/2000 | Mangahara et al. |
| 5,721,067 | A | 2/1998 | Jacobs et al. | 6,051,114 A | 4/2000 | Yao et al. |
| RE35,746 | E | 3/1998 | Lake | 6,051,296 A | 4/2000 | McCaulley et al. |
| 5,731,661 | A | 3/1998 | So et al. | 6,052,397 A | 4/2000 | Jeon et al. |
| 5,738,731 | A | 4/1998 | Shindo et al. | 6,057,557 A | 5/2000 | Ichikawa |
| 5,742,094 | A | 4/1998 | Ting | 6,058,233 A | 5/2000 | Dragone |
| 5,755,938 | A | 5/1998 | Fukui et al. | 6,071,323 A | 6/2000 | Kawaguchi |
| 5,755,940 | A | 5/1998 | Shindo | 6,075,973 A | 6/2000 | Greeff et al. |
| 5,757,126 | A | 5/1998 | Harvey, III et al. | 6,077,106 A | 6/2000 | Mish |
| 5,762,768 | A | 6/1998 | Goy et al. | 6,077,642 A | 6/2000 | Ogata et al. |
| 5,763,058 | A | 6/1998 | Isen et al. | 6,078,791 A | 6/2000 | Tuttle et al. |
| 5,771,562 | A | 6/1998 | Harvey, III et al. | 6,080,508 A | 6/2000 | Dasgupta et al. |
| 5,776,278 | A | 7/1998 | Tuttle et al. | 6,080,643 A | 6/2000 | Noguchi et al. |
| 5,779,839 | A | 7/1998 | Tuttle et al. | 6,093,944 A | 7/2000 | VanDover |
| 5,790,489 | A | 8/1998 | O'Connor | 6,094,292 A | 7/2000 | Goldner et al. |
| 5,792,550 | A | 8/1998 | Phillips et al. | 6,096,569 A | 8/2000 | Matsuno et al. |
| 5,805,223 | A | 9/1998 | Shikakura et al. | 6,100,108 A | 8/2000 | Mizuno et al. |
| 5,811,177 | A | 9/1998 | Shi et al. | 6,106,933 A | 8/2000 | Nagai et al. |
| 5,814,195 | A | 9/1998 | Lehan et al. | 6,110,531 A | 8/2000 | Paz de Araujo |
| 5,830,330 | A | 11/1998 | Lantsman | 6,115,616 A | 9/2000 | Halperin et al. |
| 5,831,262 | A | 11/1998 | Greywall et al. | 6,117,279 A | 9/2000 | Smolanoff et al. |
| 5,834,137 | A | 11/1998 | Zhang et al. | 6,118,426 A | 9/2000 | Albert et al. |
| 5,841,931 | A | 11/1998 | Foresi et al. | 6,120,890 A | 9/2000 | Chen et al. |
| 5,842,118 | A | 11/1998 | Wood, Jr. | 6,129,277 A | 10/2000 | Grant et al. |
| 5,845,990 | A | 12/1998 | Hymer | 6,133,670 A | 10/2000 | Rodgers et al. |
| 5,847,865 | A | 12/1998 | Gopinath et al. | 6,137,671 A | 10/2000 | Staffiere |
| 5,849,163 | A | 12/1998 | Ichikawa et al. | 6,144,916 A | 11/2000 | Wood, Jr. et al. |
| 5,851,896 | A | 12/1998 | Summerfelt | 6,146,225 A | 11/2000 | Sheats et al. |
| 5,853,830 | A | 12/1998 | McCaulley et al. | 6,148,503 A | 11/2000 | Delnick et al. |
| 5,855,744 | A | 1/1999 | Halsey et al. | 6,156,452 A | 12/2000 | Kozuki et al. |
| 5,856,705 | A | 1/1999 | Ting | 6,157,765 A | 12/2000 | Bruce et al. |
| 5,864,182 | A | 1/1999 | Matsuzaki | 6,159,635 A | 12/2000 | Dasgupta et al. |
| 5,865,860 | A | 2/1999 | Delnick | 6,160,373 A | 12/2000 | Dunn et al. |
| 5,870,273 | A | 2/1999 | Sogabe et al. | 6,162,709 A | 12/2000 | Raoux et al. |
| 5,874,184 | A | 2/1999 | Takeuchi et al. | 6,165,566 A | 12/2000 | Tropsha |
| 5,882,721 | A | 3/1999 | Delnick | 6,168,884 B1 | 1/2001 | Neudecker et al. |
| 5,882,946 | A | 3/1999 | Otani | 6,169,474 B1 | 1/2001 | Greeff et al. |
| 5,889,383 | A | 3/1999 | Teich | 6,175,075 B1 | 1/2001 | Shiotsuka et al. |
| 5,895,731 | A | 4/1999 | Clingempeel | 6,176,986 B1 | 1/2001 | Watanabe et al. |
| 5,897,522 | A | 4/1999 | Nitzan | 6,181,283 B1 | 1/2001 | Johnson et al. |
| 5,900,057 | A | 5/1999 | Buchal et al. | 6,192,222 B1 | 2/2001 | Greeff et al. |
| 5,909,346 | A | 6/1999 | Malhotra et al. | 6,197,167 B1 | 3/2001 | Tanaka |
| 5,916,704 | A | 6/1999 | Lewin et al. | 6,198,217 B1 | 3/2001 | Suzuki et al. |
| 5,923,964 | A | 7/1999 | Li | 6,204,111 B1 | 3/2001 | Uemoto et al. |
| 5,930,046 | A | 7/1999 | Solberg et al. | 6,210,544 B1 | 4/2001 | Sasaki |
| 5,930,584 | A | 7/1999 | Sun et al. | 6,210,832 B1 | 4/2001 | Visco et al. |
| 5,942,089 | A | 8/1999 | Sproul et al. | 6,214,061 B1 | 4/2001 | Visco et al. |
| 5,948,215 | A | 9/1999 | Lantsmann | 6,214,660 B1 | 4/2001 | Uemoto et al. |
| 5,948,464 | A | 9/1999 | Delnick | 6,218,049 B1 | 4/2001 | Bates et al. |
| 5,948,562 | A | 9/1999 | Fulcher et al. | 6,220,516 B1 | 4/2001 | Tuttle et al. |
| 5,952,778 | A | 9/1999 | Haskal et al. | 6,223,317 B1 | 4/2001 | Pax et al. |
| 5,955,217 | A | 9/1999 | Lerberghe | 6,228,532 B1 | 5/2001 | Tsuji et al. |
| 5,961,672 | A | 10/1999 | Skotheim et al. | 6,229,987 B1 | 5/2001 | Greeff et al. |
| 5,961,682 | A | 10/1999 | Lee et al. | 6,232,242 B1 | 5/2001 | Hata et al. |
| 5,966,491 | A | 10/1999 | DiGiovanni | 6,235,432 B1 | 5/2001 | Kono et al. |
| 5,970,393 | A | 10/1999 | Khorrami et al. | 6,236,793 B1 | 5/2001 | Lawrence et al. |
| 5,973,913 | A | 10/1999 | McEwen et al. | 6,242,128 B1 | 6/2001 | Tura et al. |
| 5,977,582 | A | 11/1999 | Flemming et al. | 6,242,129 B1 | 6/2001 | Johnson |
| 5,982,144 | A | 11/1999 | Johnson et al. | 6,242,132 B1 | 6/2001 | Neudecker et al. |
| 5,985,484 | A | 11/1999 | Young et al. | 6,248,291 B1 | 6/2001 | Nakagama et al. |
| 5,985,485 | A | 11/1999 | Ovshinsky et al. | 6,248,481 B1 | 6/2001 | Visco et al. |
| 6,000,603 | A | 12/1999 | Koskenmaki et al. | 6,248,640 B1 | 6/2001 | Nam |
| 6,001,224 | A | 12/1999 | Drummond et al. | 6,249,222 B1 | 6/2001 | Gehlot |
| 6,004,660 | A | 12/1999 | Topolski et al. | 6,252,564 B1 | 6/2001 | Albert et al. |
| 6,007,945 | A | 12/1999 | Jacobs et al. | 6,258,252 B1 | 7/2001 | Miyasaka et al. |
| 6,013,949 | A | 1/2000 | Tuttle | 6,261,917 B1 | 7/2001 | Quek et al. |
| 6,019,284 | A | 2/2000 | Freeman et al. | 6,264,709 B1 | 7/2001 | Yoon et al. |
| 6,023,610 | A | 2/2000 | Wood, Jr. | 6,265,652 B1 | 7/2001 | Kurata et al. |
| 6,024,844 | A | 2/2000 | Drummond et al. | 6,268,695 B1 | 7/2001 | Affinito |
| 6,025,094 | A | 2/2000 | Visco et al. | 6,271,053 B1 | 8/2001 | Kondo |
| 6,028,990 | A | 2/2000 | Shahani et al. | 6,271,793 B1 | 8/2001 | Brady et al. |

| | | |
|---|---|---|
| 6,271,801 B2 | 8/2001 | Tuttle et al. |
| 6,280,585 B1 | 8/2001 | Obinata |
| 6,280,875 B1 | 8/2001 | Kwak et al. |
| 6,281,142 B1 | 8/2001 | Basceri |
| 6,284,406 B1 | 9/2001 | Xing et al. |
| 6,287,986 B1 | 9/2001 | Mihara |
| 6,289,209 B1 | 9/2001 | Wood, Jr. |
| 6,290,821 B1 | 9/2001 | McLeod |
| 6,290,822 B1 | 9/2001 | Fleming et al. |
| 6,291,098 B1 | 9/2001 | Shibuya et al. |
| 6,294,722 B1 | 9/2001 | Kondo et al. |
| 6,296,949 B1 | 10/2001 | Bergstresser et al. |
| 6,296,967 B1 | 10/2001 | Jacobs et al. |
| 6,296,971 B1 | 10/2001 | Hara |
| 6,300,215 B1 | 10/2001 | Shin |
| 6,302,939 B1 | 10/2001 | Rabin |
| 6,306,265 B1 | 10/2001 | Fu et al. |
| 6,316,563 B2 | 11/2001 | Naijo et al. |
| 6,323,416 B1 | 11/2001 | Komori et al. |
| 6,324,211 B1 | 11/2001 | Ovard et al. |
| 6,325,294 B2 | 12/2001 | Tuttle et al. |
| 6,329,213 B1 | 12/2001 | Tuttle et al. |
| 6,339,236 B1 | 1/2002 | Tomii et al. |
| 6,340,880 B1 | 1/2002 | Higashijima et al. |
| 6,344,366 B1 | 2/2002 | Bates |
| 6,344,419 B1 | 2/2002 | Forster et al. |
| 6,344,795 B1 | 2/2002 | Gehlot |
| 6,350,353 B2 | 2/2002 | Gopalraja et al. |
| 6,351,630 B2 | 2/2002 | Wood, Jr. |
| 6,356,230 B1 | 3/2002 | Greef et al. |
| 6,356,694 B1 | 3/2002 | Weber |
| 6,356,764 B1 | 3/2002 | Ovard et al. |
| 6,358,810 B1 | 3/2002 | Dornfest et al. |
| 6,360,954 B1 | 3/2002 | Barnardo |
| 6,361,662 B1 | 3/2002 | Chiba et al. |
| 6,365,300 B1 | 4/2002 | Ota et al. |
| 6,365,319 B1 | 4/2002 | Heath et al. |
| 6,368,275 B1 | 4/2002 | Sliwa et al. |
| 6,369,316 B1 | 4/2002 | Plessing et al. |
| 6,372,383 B1 | 4/2002 | Lee et al. |
| 6,372,386 B1 | 4/2002 | Cho et al. |
| 6,373,224 B1 | 4/2002 | Goto et al. |
| 6,375,780 B1 | 4/2002 | Tuttle et al. |
| 6,376,027 B1 | 4/2002 | Lee et al. |
| 6,379,835 B1 | 4/2002 | Kucherovsky et al. |
| 6,379,842 B1 | 4/2002 | Mayer |
| 6,379,846 B1 | 4/2002 | Terahara et al. |
| 6,380,477 B1 | 4/2002 | Curtin |
| 6,384,573 B1 | 5/2002 | Dunn |
| 6,387,563 B1 | 5/2002 | Bates |
| 6,391,166 B1 | 5/2002 | Wang |
| 6,392,565 B1 | 5/2002 | Brown |
| 6,394,598 B1 | 5/2002 | Kaiser |
| 6,395,430 B1 | 5/2002 | Cho et al. |
| 6,396,001 B1 | 5/2002 | Nakamura |
| 6,398,824 B1 | 6/2002 | Johnson |
| 6,399,241 B1 | 6/2002 | Hara et al. |
| 6,402,039 B1 | 6/2002 | Freeman et al. |
| 6,402,795 B1 | 6/2002 | Chu et al. |
| 6,402,796 B1 | 6/2002 | Johnson |
| 6,409,965 B1 | 6/2002 | Nagata et al. |
| 6,413,284 B1 | 7/2002 | Chu et al. |
| 6,413,285 B1 | 7/2002 | Chu et al. |
| 6,413,382 B1 | 7/2002 | Wang et al. |
| 6,413,645 B1 | 7/2002 | Graff et al. |
| 6,413,676 B1 | 7/2002 | Munshi |
| 6,414,626 B1 | 7/2002 | Greef et al. |
| 6,416,598 B1 | 7/2002 | Sircar |
| 6,420,961 B1 | 7/2002 | Bates et al. |
| 6,422,698 B2 | 7/2002 | Kaiser |
| 6,423,106 B1 | 7/2002 | Bates |
| 6,423,776 B1 | 7/2002 | Akkapeddi et al. |
| 6,426,163 B1 | 7/2002 | Pasquier et al. |
| 6,432,577 B1 | 8/2002 | Shul et al. |
| 6,432,584 B1 | 8/2002 | Visco et al. |
| 6,433,380 B2 | 8/2002 | Shin |
| 6,433,465 B1 | 8/2002 | McKnight et al. |
| 6,436,156 B1 | 8/2002 | Wandeloski et al. |
| 6,437,231 B2 | 8/2002 | Kurata et al. |
| 6,444,336 B1 | 9/2002 | Jia et al. |
| 6,444,355 B1 | 9/2002 | Murai et al. |
| 6,444,368 B1 | 9/2002 | Hikmet et al. |
| 6,444,750 B1 | 9/2002 | Touhsaent |
| 6,459,418 B1 | 10/2002 | Comiskey et al. |
| 6,459,726 B1 | 10/2002 | Ovard et al. |
| 6,466,771 B2 | 10/2002 | Wood, Jr. |
| 6,475,668 B1 | 11/2002 | Hosokawa et al. |
| 6,480,699 B1 | 11/2002 | Lovoi |
| 6,481,623 B1 | 11/2002 | Grant et al. |
| 6,488,822 B1 | 12/2002 | Moslehi |
| 6,494,999 B1 | 12/2002 | Herrera et al. |
| 6,495,283 B1 | 12/2002 | Yoon et al. |
| 6,497,598 B2 | 12/2002 | Affinito |
| 6,500,287 B1 | 12/2002 | Azens et al. |
| 6,503,661 B1 | 1/2003 | Park et al. |
| 6,503,831 B2 | 1/2003 | Speakman |
| 6,506,289 B2 | 1/2003 | Demaray et al. |
| 6,511,516 B1 | 1/2003 | Johnson et al. |
| 6,511,615 B1 | 1/2003 | Dawes et al. |
| 6,517,968 B2 | 2/2003 | Johnson et al. |
| 6,522,067 B1 | 2/2003 | Graff et al. |
| 6,524,466 B1 | 2/2003 | Bonaventura et al. |
| 6,524,750 B1 | 2/2003 | Mansuetto |
| 6,525,976 B1 | 2/2003 | Johnson |
| 6,528,212 B1 | 3/2003 | Kusumoto et al. |
| 6,529,827 B1 | 3/2003 | Beason et al. |
| 6,533,907 B2 | 3/2003 | Demaray et al. |
| 6,537,428 B1 | 3/2003 | Xiong et al. |
| 6,538,211 B2 | 3/2003 | St. Lawrence et al. |
| 6,541,147 B1 | 4/2003 | McLean et al. |
| 6,548,912 B1 | 4/2003 | Graff et al. |
| 6,551,745 B2 | 4/2003 | Moutsios et al. |
| 6,558,836 B1 | 5/2003 | Whitacre et al. |
| 6,562,513 B1 | 5/2003 | Takeuchi et al. |
| 6,563,998 B1 | 5/2003 | Farah et al. |
| 6,569,564 B1 | 5/2003 | Lane |
| 6,569,570 B2 | 5/2003 | Sonobe et al. |
| 6,570,325 B2 | 5/2003 | Graff et al. |
| 6,572,173 B2 | 6/2003 | Muller |
| 6,573,652 B1 | 6/2003 | Graff et al. |
| 6,576,546 B2 | 6/2003 | Gilbert et al. |
| 6,579,728 B2 | 6/2003 | Grant et al. |
| 6,582,480 B1 | 6/2003 | Pasquier et al. |
| 6,582,481 B1 | 6/2003 | Erbil |
| 6,582,852 B1 | 6/2003 | Gao et al. |
| 6,589,299 B2 | 7/2003 | Missling et al. |
| 6,593,150 B2 | 7/2003 | Ramberg et al. |
| 6,599,662 B1 | 7/2003 | Chiang et al. |
| 6,600,905 B2 | 7/2003 | Greeff et al. |
| 6,602,338 B2 | 8/2003 | Chen et al. |
| 6,603,139 B1 | 8/2003 | Tessler et al. |
| 6,603,391 B1 | 8/2003 | Greeff et al. |
| 6,605,228 B1 | 8/2003 | Kawaguchi et al. |
| 6,608,464 B1 | 8/2003 | Lew et al. |
| 6,608,470 B1 | 8/2003 | Oglesbee et al. |
| 6,610,440 B1 | 8/2003 | LaFollette et al. |
| 6,615,614 B1 | 9/2003 | Makikawa et al. |
| 6,616,035 B2 | 9/2003 | Ehrensvard et al. |
| 6,618,829 B2 | 9/2003 | Pax et al. |
| 6,620,545 B2 | 9/2003 | Goenka et al. |
| 6,622,049 B2 | 9/2003 | Penner et al. |
| 6,632,563 B1 | 10/2003 | Krasnov et al. |
| 6,637,906 B2 | 10/2003 | Knoerzer et al. |
| 6,637,916 B2 | 10/2003 | Mullner |
| 6,639,578 B1 | 10/2003 | Comiskey et al. |
| 6,642,895 B2 | 11/2003 | Zurcher et al. |
| 6,645,675 B1 | 11/2003 | Munshi |
| 6,650,000 B2 | 11/2003 | Ballantine et al. |
| 6,650,942 B2 | 11/2003 | Howard et al. |
| 6,662,430 B2 | 12/2003 | Brady et al. |
| 6,664,006 B1 | 12/2003 | Munshi |
| 6,673,484 B2 | 1/2004 | Matsuura |
| 6,673,716 B1 | 1/2004 | D'Couto et al. |
| 6,674,159 B1 | 1/2004 | Peterson et al. |
| 6,677,070 B2 | 1/2004 | Kearl |
| 6,683,244 B2 | 1/2004 | Fujimori et al. |
| 6,683,749 B2 | 1/2004 | Daby et al. |
| 6,686,096 B1 | 2/2004 | Chung |

| Patent | Type | Date | Inventor |
|---|---|---|---|
| 6,693,840 | B2 | 2/2004 | Shimada et al. |
| 6,700,491 | B2 | 3/2004 | Shafer |
| 6,706,449 | B2 | 3/2004 | Mikhaylik et al. |
| 6,709,778 | B2 | 3/2004 | Johnson |
| 6,713,216 | B2 | 3/2004 | Kugai et al. |
| 6,713,389 | B2 | 3/2004 | Speakman |
| 6,713,987 | B2 | 3/2004 | Krasnov et al. |
| 6,723,140 | B2 | 4/2004 | Chu et al. |
| 6,730,423 | B2 | 5/2004 | Einhart et al. |
| 6,733,924 | B1 | 5/2004 | Skotheim et al. |
| 6,737,197 | B2 | 5/2004 | Chu et al. |
| 6,737,789 | B2 | 5/2004 | Radziemski et al. |
| 6,741,178 | B1 | 5/2004 | Tuttle |
| 6,750,156 | B2 | 6/2004 | Le et al. |
| 6,752,842 | B2 | 6/2004 | Luski et al. |
| 6,753,108 | B1 | 6/2004 | Hampden-Smith et al. |
| 6,753,114 | B2 | 6/2004 | Jacobs et al. |
| 6,760,520 | B1 | 7/2004 | Medin et al. |
| 6,764,525 | B1 | 7/2004 | Whitacre et al. |
| 6,768,246 | B2 | 7/2004 | Pelrine et al. |
| 6,768,855 | B1 | 7/2004 | Bakke et al. |
| 6,770,176 | B2 | 8/2004 | Benson et al. |
| 6,773,848 | B1 | 8/2004 | Nortoft et al. |
| 6,780,208 | B2 | 8/2004 | Hopkins et al. |
| 6,797,428 | B1 | 9/2004 | Skotheim et al. |
| 6,797,429 | B1 | 9/2004 | Komatsu |
| 6,805,998 | B2 | 10/2004 | Jenson et al. |
| 6,805,999 | B2 | 10/2004 | Lee et al. |
| 6,818,356 | B1 | 11/2004 | Bates |
| 6,822,157 | B2 | 11/2004 | Fujioka |
| 6,824,922 | B2 | 11/2004 | Park et al. |
| 6,827,826 | B2 | 12/2004 | Demaray et al. |
| 6,828,063 | B2 | 12/2004 | Park et al. |
| 6,828,065 | B2 | 12/2004 | Munshi |
| 6,830,846 | B2 | 12/2004 | Kramlich et al. |
| 6,835,493 | B2 | 12/2004 | Zhang et al. |
| 6,838,209 | B2 | 1/2005 | Langan et al. |
| 6,846,765 | B2 | 1/2005 | Imamura et al. |
| 6,852,139 | B2 | 2/2005 | Zhang et al. |
| 6,855,441 | B1 | 2/2005 | Levanon |
| 6,861,821 | B2 | 3/2005 | Masumoto et al. |
| 6,863,699 | B1 | 3/2005 | Krasnov et al. |
| 6,866,901 | B2 | 3/2005 | Burrows et al. |
| 6,866,963 | B2 | 3/2005 | Seung et al. |
| 6,869,722 | B2 | 3/2005 | Kearl |
| 6,884,327 | B2 | 4/2005 | Pan et al. |
| 6,886,240 | B2 | 5/2005 | Zhang et al. |
| 6,890,385 | B2 | 5/2005 | Tsuchiya et al. |
| 6,896,992 | B2 | 5/2005 | Kearl |
| 6,899,975 | B2 | 5/2005 | Watanabe et al. |
| 6,902,660 | B2 | 6/2005 | Lee et al. |
| 6,905,578 | B1 | 6/2005 | Moslehi et al. |
| 6,906,436 | B2 | 6/2005 | Jenson et al. |
| 6,911,667 | B2 | 6/2005 | Pichler et al. |
| 6,916,679 | B2 | 7/2005 | Snyder et al. |
| 6,921,464 | B2 | 7/2005 | Krasnov et al. |
| 6,923,702 | B2 | 8/2005 | Graff et al. |
| 6,924,164 | B2 | 8/2005 | Jensen |
| 6,929,879 | B2 | 8/2005 | Yamazaki |
| 6,936,377 | B2 | 8/2005 | Wensley et al. |
| 6,936,381 | B2 | 8/2005 | Skotheim et al. |
| 6,936,407 | B2 | 8/2005 | Pichler |
| 6,949,389 | B2 | 9/2005 | Pichler et al. |
| 6,955,986 | B2 | 10/2005 | Li |
| 6,962,613 | B2 | 11/2005 | Jenson |
| 6,962,671 | B2 | 11/2005 | Martin et al. |
| 6,964,829 | B2 | 11/2005 | Utsugi et al. |
| 6,982,132 | B1 | 1/2006 | Goldner et al. |
| 6,986,965 | B2 | 1/2006 | Jenson et al. |
| 6,994,933 | B1 | 2/2006 | Bates |
| 7,022,431 | B2 | 4/2006 | Shchori et al. |
| 7,033,406 | B2 | 4/2006 | Weir et al. |
| 7,045,246 | B2 | 5/2006 | Simburger et al. |
| 7,045,372 | B2 | 5/2006 | Ballantine et al. |
| 7,056,620 | B2 | 6/2006 | Krasnov et al. |
| 7,073,723 | B2 | 7/2006 | Fürst et al. |
| 7,095,372 | B2 | 8/2006 | Soler Castany et al. |
| 7,129,166 | B2 | 10/2006 | Speakman |
| 7,131,189 | B2 | 11/2006 | Jenson |
| 7,144,654 | B2 | 12/2006 | LaFollette et al. |
| 7,144,655 | B2 | 12/2006 | Jenson et al. |
| 7,157,187 | B2 | 1/2007 | Jenson |
| 7,158,031 | B2 | 1/2007 | Tuttle |
| 7,162,392 | B2 | 1/2007 | Vock et al. |
| 7,183,693 | B2 | 2/2007 | Brantner et al. |
| 7,186,479 | B2 | 3/2007 | Krasnov et al. |
| 7,194,801 | B2 | 3/2007 | Jenson et al. |
| 7,198,832 | B2 | 4/2007 | Burrows et al. |
| 7,202,825 | B2 | 4/2007 | Leizerovich et al. |
| 7,220,517 | B2 | 5/2007 | Park et al. |
| 7,230,321 | B2 | 6/2007 | McCain |
| 7,247,408 | B2 | 7/2007 | Skotheim et al. |
| 7,253,494 | B2 | 8/2007 | Mino et al. |
| 7,265,674 | B2 | 9/2007 | Tuttle |
| 7,267,904 | B2 | 9/2007 | Komatsu et al. |
| 7,267,906 | B2 | 9/2007 | Mizuta et al. |
| 7,273,682 | B2 | 9/2007 | Park et al. |
| 7,274,118 | B2 | 9/2007 | Jenson et al. |
| 7,288,340 | B2 | 10/2007 | Iwamoto |
| 7,316,867 | B2 | 1/2008 | Park et al. |
| 7,323,634 | B2 | 1/2008 | Speakman |
| 7,332,363 | B2 | 2/2008 | Edwards |
| 7,335,441 | B2 | 2/2008 | Luski et al. |
| RE40,137 | E | 3/2008 | Tuttle et al. |
| 7,345,647 | B1 | 3/2008 | Rodenbeck |
| 7,348,099 | B2 | 3/2008 | Mukai et al. |
| 7,389,580 | B2 | 6/2008 | Jenson et al. |
| 7,400,253 | B2 | 7/2008 | Cohen |
| 7,410,730 | B2 | 8/2008 | Bates |
| RE40,531 | E | 10/2008 | Graff et al. |
| 7,466,274 | B2 | 12/2008 | Lin et al. |
| 7,468,221 | B2 | 12/2008 | LaFollette et al. |
| 7,494,742 | B2 | 2/2009 | Tarnowski et al. |
| 7,670,724 | B1 | 3/2010 | Chan et al. |
| 7,848,715 | B2 | 12/2010 | Boos |
| 7,858,223 | B2 | 12/2010 | Visco et al. |
| 8,010,048 | B2 | 8/2011 | Brommer et al. |
| 8,056,814 | B2 | 11/2011 | Martin et al. |
| 2001/0005561 | A1 | 6/2001 | Yamada et al. |
| 2001/0027159 | A1 | 10/2001 | Kaneyoshi |
| 2001/0031122 | A1 | 10/2001 | Lackritz et al. |
| 2001/0032666 | A1 | 10/2001 | Jenson et al. |
| 2001/0033952 | A1 | 10/2001 | Jenson et al. |
| 2001/0034106 | A1 | 10/2001 | Moise et al. |
| 2001/0041294 | A1 | 11/2001 | Chu et al. |
| 2001/0041460 | A1 | 11/2001 | Wiggins |
| 2001/0052752 | A1 | 12/2001 | Ghosh et al. |
| 2001/0054437 | A1 | 12/2001 | Komori et al. |
| 2001/0055719 | A1 | 12/2001 | Akashi et al. |
| 2002/0000034 | A1 | 1/2002 | Jenson |
| 2002/0001746 | A1 | 1/2002 | Jenson |
| 2002/0001747 | A1 | 1/2002 | Jenson |
| 2002/0004167 | A1 | 1/2002 | Jenson et al. |
| 2002/0009630 | A1 | 1/2002 | Gao et al. |
| 2002/0019296 | A1 | 2/2002 | Freeman et al. |
| 2002/0028377 | A1 | 3/2002 | Gross |
| 2002/0033330 | A1 | 3/2002 | Demaray et al. |
| 2002/0037756 | A1 | 3/2002 | Jacobs et al. |
| 2002/0066539 | A1 | 6/2002 | Muller |
| 2002/0067615 | A1 | 6/2002 | Muller |
| 2002/0071989 | A1 | 6/2002 | Verma et al. |
| 2002/0076133 | A1 | 6/2002 | Li et al. |
| 2002/0091929 | A1 | 7/2002 | Ehrensvard |
| 2002/0093029 | A1 | 7/2002 | Ballantine et al. |
| 2002/0106297 | A1 | 8/2002 | Ueno et al. |
| 2002/0110733 | A1 | 8/2002 | Johnson |
| 2002/0115252 | A1 | 8/2002 | Haukka et al. |
| 2002/0134671 | A1 | 9/2002 | Demaray et al. |
| 2002/0139662 | A1 | 10/2002 | Lee |
| 2002/0140103 | A1 | 10/2002 | Kloster et al. |
| 2002/0159245 | A1 | 10/2002 | Murasko et al. |
| 2002/0161404 | A1 | 10/2002 | Schmidt |
| 2002/0164441 | A1 | 11/2002 | Amine et al. |
| 2002/0170821 | A1 | 11/2002 | Sandlin et al. |
| 2002/0170960 | A1 | 11/2002 | Ehrensvard et al. |
| 2003/0019326 | A1 | 1/2003 | Han et al. |
| 2003/0022487 | A1 | 1/2003 | Yoon et al. |
| 2003/0024994 | A1 | 2/2003 | Ladyansky |

| | | | |
|---|---|---|---|
| 2003/0029493 A1 | 2/2003 | Plessing | |
| 2003/0030589 A1 | 2/2003 | Zurcher et al. | |
| 2003/0035906 A1 | 2/2003 | Memarian et al. | |
| 2003/0036003 A1 | 2/2003 | Shchori et al. | |
| 2003/0042131 A1 | 3/2003 | Johnson | |
| 2003/0044665 A1 | 3/2003 | Rastegar et al. | |
| 2003/0048635 A1 | 3/2003 | Knoerzer et al. | |
| 2003/0063883 A1 | 4/2003 | Demaray et al. | |
| 2003/0064292 A1 | 4/2003 | Neudecker et al. | |
| 2003/0068559 A1 | 4/2003 | Armstrong et al. | |
| 2003/0076642 A1 | 4/2003 | Shiner et al. | |
| 2003/0077914 A1 | 4/2003 | Le et al. | |
| 2003/0079838 A1 | 5/2003 | Brcka | |
| 2003/0091904 A1 | 5/2003 | Munshi | |
| 2003/0095463 A1 | 5/2003 | Shimada et al. | |
| 2003/0097858 A1 | 5/2003 | Strohhofer et al. | |
| 2003/0109903 A1 | 6/2003 | Berrang et al. | |
| 2003/0127319 A1 | 7/2003 | Demaray et al. | |
| 2003/0134054 A1 | 7/2003 | Demaray et al. | |
| 2003/0141186 A1 | 7/2003 | Wang et al. | |
| 2003/0143853 A1 | 7/2003 | Celii et al. | |
| 2003/0146877 A1 | 8/2003 | Mueller | |
| 2003/0152829 A1 | 8/2003 | Zhang et al. | |
| 2003/0162094 A1 | 8/2003 | Lee et al. | |
| 2003/0173207 A1 | 9/2003 | Zhang et al. | |
| 2003/0173208 A1 | 9/2003 | Pan et al. | |
| 2003/0174391 A1 | 9/2003 | Pan et al. | |
| 2003/0175142 A1 | 9/2003 | Milonopoulou et al. | |
| 2003/0178623 A1 | 9/2003 | Nishiki et al. | |
| 2003/0178637 A1 | 9/2003 | Chen et al. | |
| 2003/0180610 A1 | 9/2003 | Felde et al. | |
| 2003/0185266 A1 | 10/2003 | Henrichs | |
| 2003/0231106 A1 | 12/2003 | Shafer | |
| 2003/0232248 A1 | 12/2003 | Iwamoto et al. | |
| 2004/0008587 A1 | 1/2004 | Siebott et al. | |
| 2004/0015735 A1 | 1/2004 | Norman | |
| 2004/0023106 A1 | 2/2004 | Benson et al. | |
| 2004/0028875 A1 | 2/2004 | Van Rijn et al. | |
| 2004/0029311 A1 | 2/2004 | Snyder et al. | |
| 2004/0038050 A1 | 2/2004 | Saijo et al. | |
| 2004/0043557 A1 | 3/2004 | Haukka et al. | |
| 2004/0048157 A1* | 3/2004 | Neudecker et al. | 429/231.2 |
| 2004/0058237 A1 | 3/2004 | Higuchi et al. | |
| 2004/0072067 A1 | 4/2004 | Minami et al. | |
| 2004/0077161 A1 | 4/2004 | Chen et al. | |
| 2004/0078662 A1 | 4/2004 | Hamel et al. | |
| 2004/0081415 A1 | 4/2004 | Demaray et al. | |
| 2004/0081860 A1 | 4/2004 | Hundt et al. | |
| 2004/0085002 A1 | 5/2004 | Pearce | |
| 2004/0101761 A1 | 5/2004 | Park et al. | |
| 2004/0105644 A1 | 6/2004 | Dawes | |
| 2004/0106038 A1 | 6/2004 | Shimamura et al. | |
| 2004/0106045 A1 | 6/2004 | Ugaji et al. | |
| 2004/0106046 A1 | 6/2004 | Inda | |
| 2004/0118700 A1 | 6/2004 | Schierle-Arndt et al. | |
| 2004/0126305 A1 | 7/2004 | Chen et al. | |
| 2004/0151986 A1 | 8/2004 | Park et al. | |
| 2004/0161640 A1 | 8/2004 | Salot | |
| 2004/0175624 A1 | 9/2004 | Luski et al. | |
| 2004/0188239 A1 | 9/2004 | Robison et al. | |
| 2004/0209159 A1 | 10/2004 | Lee et al. | |
| 2004/0212276 A1 | 10/2004 | Brantner et al. | |
| 2004/0214079 A1 | 10/2004 | Simburger et al. | |
| 2004/0219434 A1 | 11/2004 | Benson et al. | |
| 2004/0245561 A1 | 12/2004 | Sakashita et al. | |
| 2004/0258984 A1 | 12/2004 | Ariel et al. | |
| 2004/0259305 A1 | 12/2004 | Demaray et al. | |
| 2005/0000794 A1 | 1/2005 | Demaray et al. | |
| 2005/0006768 A1 | 1/2005 | Narasimhan et al. | |
| 2005/0048802 A1 | 3/2005 | Zhang et al. | |
| 2005/0070097 A1 | 3/2005 | Barmak et al. | |
| 2005/0072458 A1 | 4/2005 | Goldstein | |
| 2005/0079418 A1 | 4/2005 | Kelley et al. | |
| 2005/0095506 A1 | 5/2005 | Klaassen | |
| 2005/0105231 A1 | 5/2005 | Hamel et al. | |
| 2005/0110457 A1 | 5/2005 | LaFollette et al. | |
| 2005/0112461 A1 | 5/2005 | Amine et al. | |
| 2005/0118464 A1 | 6/2005 | Levanon | |
| 2005/0130032 A1 | 6/2005 | Krasnov et al. | |
| 2005/0133361 A1 | 6/2005 | Ding et al. | |
| 2005/0141170 A1 | 6/2005 | Honda et al. | |
| 2005/0142447 A1 | 6/2005 | Nakai et al. | |
| 2005/0147877 A1 | 7/2005 | Tarnowski et al. | |
| 2005/0158622 A1 | 7/2005 | Mizuta et al. | |
| 2005/0170736 A1 | 8/2005 | Cok | |
| 2005/0175891 A1 | 8/2005 | Kameyama et al. | |
| 2005/0176181 A1 | 8/2005 | Burrows et al. | |
| 2005/0181280 A1 | 8/2005 | Ceder et al. | |
| 2005/0183946 A1 | 8/2005 | Pan et al. | |
| 2005/0186469 A1* | 8/2005 | De Jonghe et al. | 429/137 |
| 2005/0189139 A1 | 9/2005 | Stole | |
| 2005/0208371 A1 | 9/2005 | Kim et al. | |
| 2005/0239917 A1 | 10/2005 | Nelson et al. | |
| 2005/0255828 A1 | 11/2005 | Fisher | |
| 2005/0266161 A1 | 12/2005 | Medeiros et al. | |
| 2006/0019504 A1 | 1/2006 | Taussig | |
| 2006/0021214 A1 | 2/2006 | Jenson et al. | |
| 2006/0021261 A1 | 2/2006 | Face | |
| 2006/0040177 A1 | 2/2006 | Onodera et al. | |
| 2006/0046907 A1 | 3/2006 | Rastegar et al. | |
| 2006/0054496 A1 | 3/2006 | Zhang et al. | |
| 2006/0057283 A1 | 3/2006 | Zhang et al. | |
| 2006/0057304 A1 | 3/2006 | Zhang et al. | |
| 2006/0063074 A1 | 3/2006 | Jenson et al. | |
| 2006/0071592 A1 | 4/2006 | Narasimhan et al. | |
| 2006/0155545 A1 | 7/2006 | Jayne | |
| 2006/0201583 A1 | 9/2006 | Michaluk et al. | |
| 2006/0210779 A1 | 9/2006 | Weir et al. | |
| 2006/0222954 A1 | 10/2006 | Skotheim et al. | |
| 2006/0234130 A1 | 10/2006 | Inda | |
| 2006/0237543 A1 | 10/2006 | Goto et al. | |
| 2006/0255435 A1 | 11/2006 | Fuergut et al. | |
| 2006/0286448 A1* | 12/2006 | Snyder et al. | 429/176 |
| 2007/0009802 A1 | 1/2007 | Lee et al. | |
| 2007/0021156 A1 | 1/2007 | Hoong et al. | |
| 2007/0023275 A1 | 2/2007 | Tanase et al. | |
| 2007/0037058 A1 | 2/2007 | Visco et al. | |
| 2007/0053139 A1 | 3/2007 | Zhang et al. | |
| 2007/0087230 A1 | 4/2007 | Jenson et al. | |
| 2007/0091543 A1 | 4/2007 | Gasse et al. | |
| 2007/0125638 A1 | 6/2007 | Zhang et al. | |
| 2007/0141468 A1 | 6/2007 | Barker | |
| 2007/0148065 A1 | 6/2007 | Weir et al. | |
| 2007/0148553 A1 | 6/2007 | Weppner | |
| 2007/0151661 A1 | 7/2007 | Mao et al. | |
| 2007/0164376 A1 | 7/2007 | Burrows et al. | |
| 2007/0166612 A1 | 7/2007 | Krasnov et al. | |
| 2007/0184345 A1* | 8/2007 | Neudecker et al. | 429/209 |
| 2007/0196682 A1 | 8/2007 | Visser et al. | |
| 2007/0202395 A1 | 8/2007 | Snyder et al. | |
| 2007/0205513 A1 | 9/2007 | Brunnbauer et al. | |
| 2007/0210459 A1 | 9/2007 | Burrows et al. | |
| 2007/0222681 A1 | 9/2007 | Greene et al. | |
| 2007/0224951 A1 | 9/2007 | Gilb et al. | |
| 2007/0229228 A1 | 10/2007 | Yamazaki et al. | |
| 2007/0235320 A1 | 10/2007 | White et al. | |
| 2007/0264564 A1* | 11/2007 | Johnson et al. | 429/161 |
| 2007/0278653 A1 | 12/2007 | Brunnbauer et al. | |
| 2007/0298326 A1 | 12/2007 | Angell et al. | |
| 2008/0003496 A1 | 1/2008 | Neudecker et al. | |
| 2008/0008936 A1 | 1/2008 | Mizuta et al. | |
| 2008/0014501 A1 | 1/2008 | Skotheim et al. | |
| 2008/0057397 A1 | 3/2008 | Skotheim et al. | |
| 2008/0150829 A1 | 6/2008 | Lin et al. | |
| 2008/0213672 A1 | 9/2008 | Skotheim et al. | |
| 2008/0233708 A1 | 9/2008 | Hisamatsu | |
| 2008/0254575 A1 | 10/2008 | Fuergut et al. | |
| 2008/0261107 A1 | 10/2008 | Snyder et al. | |
| 2008/0263855 A1 | 10/2008 | Li et al. | |
| 2008/0286651 A1 | 11/2008 | Neudecker et al. | |
| 2009/0092903 A1 | 4/2009 | Johnson et al. | |
| 2009/0124201 A1 | 5/2009 | Meskens | |
| 2009/0302226 A1 | 12/2009 | Schieber et al. | |
| 2009/0308936 A1 | 12/2009 | Nitzan et al. | |
| 2009/0312069 A1 | 12/2009 | Peng et al. | |
| 2010/0001079 A1 | 1/2010 | Martin et al. | |
| 2010/0032001 A1 | 2/2010 | Brantner | |

| | | | |
|---|---|---|---|
| 2010/0086853 A1 | 4/2010 | Venkatachalam et al. | |
| 2011/0267235 A1 | 11/2011 | Brommer et al. | |
| 2011/0304430 A1 | 12/2011 | Brommer et al. | |

FOREIGN PATENT DOCUMENTS

| | | |
|---|---|---|
| DE | 19824145 | 12/1999 |
| DE | 10 2005 014 427 | 9/2006 |
| DE | 10 2006 054 309 | 11/2006 |
| DE | 10 2008 016 665 | 10/2008 |
| DE | 102007030604 | 1/2009 |
| EP | 0 510 883 | 10/1992 |
| EP | 0 639 655 | 2/1995 |
| EP | 0 652 308 | 5/1995 |
| EP | 0 820 088 | 1/1998 |
| EP | 1 068 899 | 1/2001 |
| EP | 0 867 985 | 2/2001 |
| EP | 1 092 689 | 4/2001 |
| EP | 1 189 080 | 3/2002 |
| EP | 1 713 024 | 10/2006 |
| FR | 2806198 | 9/2001 |
| FR | 2 861 218 | 4/2005 |
| JO | 7-107752 | 4/2007 |
| JP | 55-009305 | 1/1980 |
| JP | 56-076060 | 6/1981 |
| JP | 56-156675 | 12/1981 |
| JP | 60-068558 | 4/1985 |
| JP | 61-269072 | 11/1986 |
| JP | 62-267944 | 11/1987 |
| JP | 63-290922 | 11/1988 |
| JP | 2000-162234 | 11/1988 |
| JP | 2-054764 | 2/1990 |
| JP | 2-230662 | 9/1990 |
| JP | 03-036962 | 2/1991 |
| JP | 4-058456 | 2/1992 |
| JP | 4-072049 | 3/1992 |
| JP | 6-010127 | 1/1994 |
| JP | 6-100333 | 4/1994 |
| JP | 7-233469 | 5/1995 |
| JP | 7-224379 | 8/1995 |
| JP | 08-114408 | 5/1996 |
| JP | 10-026571 | 1/1998 |
| JP | 10-239187 | 9/1998 |
| JP | 11-204088 | 7/1999 |
| JP | 2000-144435 | 5/2000 |
| JP | 2000-188099 | 7/2000 |
| JP | 2000-268867 | 9/2000 |
| JP | 2001-171812 | 6/2001 |
| JP | 2001-259494 | 9/2001 |
| JP | 2001-297764 | 10/2001 |
| JP | 2001-328198 | 11/2001 |
| JP | 2002-140776 | 5/2002 |
| JP | 2002-344115 | 11/2002 |
| JP | 2003-17040 | 1/2003 |
| JP | 2003-347045 | 12/2003 |
| JP | 2004-071305 | 3/2004 |
| JP | 2004-149849 | 5/2004 |
| JP | 2004-158268 | 6/2004 |
| JP | 2004-273436 | 9/2004 |
| JP | 2005-256101 | 9/2005 |
| JP | 2002-026412 | 2/2007 |
| JP | 7-107752 | 4/2007 |
| KR | 20020007881 | 1/2002 |
| KR | 20020017790 | 3/2002 |
| KR | 20020029813 | 4/2002 |
| KR | 20020038917 | 5/2002 |
| KR | 20030033913 | 5/2003 |
| KR | 20030042288 | 5/2003 |
| KR | 20030085252 | 11/2003 |
| RU | 2241281 | 11/2004 |
| WO | WO 9513629 | 5/1995 |
| WO | WO 9623085 | 8/1996 |
| WO | WO 9623217 | 8/1996 |
| WO | WO 9727344 | 7/1997 |
| WO | WO 9735044 | 9/1997 |
| WO | WO 9847196 | 10/1998 |
| WO | WO 9943034 | 8/1999 |
| WO | WO 9957770 | 11/1999 |
| WO | WO 0021898 | 4/2000 |
| WO | WO 0022742 | 4/2000 |
| WO | WO 0028607 | 5/2000 |
| WO | WO 0036665 | 6/2000 |
| WO | WO 0060682 | 10/2000 |
| WO | WO 0060689 | 10/2000 |
| WO | WO 0062365 | 10/2000 |
| WO | WO 0101507 | 1/2001 |
| WO | WO 0117052 | 3/2001 |
| WO | WO 0124303 | 4/2001 |
| WO | WO 0133651 | 5/2001 |
| WO | WO 0139305 | 5/2001 |
| WO | WO 0173864 | 10/2001 |
| WO | WO 0173865 | 10/2001 |
| WO | WO 0173866 | 10/2001 |
| WO | WO 0173868 | 10/2001 |
| WO | WO 0173870 | 10/2001 |
| WO | WO 0173883 | 10/2001 |
| WO | WO 0173957 | 10/2001 |
| WO | WO 0182390 | 11/2001 |
| WO | WO 0212932 | 2/2002 |
| WO | WO 0242516 | 5/2002 |
| WO | WO 0247187 | 6/2002 |
| WO | WO 02071506 | 9/2002 |
| WO | WO 02101857 | 12/2002 |
| WO | WO 03003485 | 1/2003 |
| WO | WO 03005477 | 1/2003 |
| WO | WO 03026039 | 3/2003 |
| WO | WO 03036670 | 5/2003 |
| WO | WO 03069714 | 8/2003 |
| WO | WO 03080325 | 10/2003 |
| WO | WO 03083166 | 10/2003 |
| WO | WO 2004012283 | 2/2004 |
| WO | WO 2004021532 | 3/2004 |
| WO | WO 2004061887 | 7/2004 |
| WO | WO 2004077519 | 9/2004 |
| WO | WO 2004086550 | 10/2004 |
| WO | WO 2004093223 | 10/2004 |
| WO | WO 2004106581 | 12/2004 |
| WO | WO 2004106582 | 12/2004 |
| WO | WO 2005008828 | 1/2005 |
| WO | WO 2005013394 | 2/2005 |
| WO | WO 2005038957 | 4/2005 |
| WO | WO 2005067645 | 7/2005 |
| WO | WO 2005085138 | 9/2005 |
| WO | WO 2005091405 | 9/2005 |
| WO | WO 2006063308 | 6/2006 |
| WO | WO 2006085307 | 8/2006 |
| WO | WO 2007016781 | 2/2007 |
| WO | WO 2007019855 | 2/2007 |
| WO | WO 2007027535 | 3/2007 |
| WO | WO 2007095604 | 8/2007 |
| WO | WO 2008036731 | 3/2008 |

OTHER PUBLICATIONS

Belkind, A. et al., "Using pulsed direct current power for reactive sputtering of $Al_2O_3$," J. Vac. Sci. Technol. A 17(4): 1934-1940 (1999).

Bestwick, T., "ASOC™ silicon integrated optics technology," SPIE 3631: 182-190 (1999).

Borsella, E. et al., "Structural incorporation of silver in soda-lime glass by the ion-exchange process: a photoluminescence spectroscopy study," Applied Physics A 71: 125-132 (2000).

Byer, R.L., "Nonlinear optics and solid-state lasers: 2000," IEEE J. Selected Topics in Quantum Electronics 6(6): 911-930 (2000).

Campbell, S.A. et al., "Titanium dioxide (TiO2)-based gate insulators," IBM J. Res. Develop. 43(3): 383-392 (1999).

Chang, C.Y. and Sze, S.M. (eds.), in ULSI Technology, The McGraw-Hill Companies, Inc., Nyew York, Chapter 4, pp. 169-170 and 226-231 (1996).

Chen, G. et al., "Development of supported bifunctional electrocatalysts for unitized regenerative fuel cells," J. Electrochemical Society 149(8): A1092-A1099 (2002).

Choi, Y.B. et al., "Er-Al-codoped silicate planar light waveguide-type amplifier fabricated by radio-frequency sputtering," Optics Letters 25(4): 263-265 (2000).

Choy et al., "Eu-Doped Y2O3 Phosphor Films Produced by Electrostatic-Assisted Chemical Vapor Deposition," J. Mater. Res. 14(7): 3111-3114 (Jul. 1999).

Cocorullo, G. et al., "Amorphous silicon waveguides and light modulators for integrated photonics realized by low-temperature plasma-enhanced chemical-vapor deposition," Optics Lett. 21(24): 2002-2004 (1996).

Cooksey, K. et al., "Predicting permeability & Transmission rate for multilayer materials," Food Technology 53(9): 60-63 (1999).

Crowder, M.A. et al., "Low-temperature single-crystal Si TFT's fabricated on Si films processed via sequential lateral solidification," IEEE Electron Device Lett. 19(8): 306-308 (1998).

Delavaux, J-M. et al., "Integrated optics erbium ytterbium amplifier system in 10Gb/s fiber transmission experiment," $22^{nd}$ European Conference on Optical Communication, Osla, I.123-I.126 (1996).

Distributed Energy Resources: Fuel Cells, Projects, 4 pages http://www.eere.energy.gov/der/fuel_cells/projects.html (2003).

Dorey, R.A., "Low temperature micromoulding of functional ceramic devices," Grant summary for GR/S84156/01 for the UK Engineering and Physical Sciences Research Council, 2 pages (2004).

DuPont Teijin Films, Mylar 200 SBL 300, Product Information, 4 pages (2000).

Electrometals Technologies Limited, Financial Report for 2002, Corporate Directory, Chairman's review, Review of Operations, 10 pages (2002).

E-Tek website: FAQ, Inside E-Tek, E-TEk News, Products; http://www.etek-inc.com/, 10 pages (2003).

Flytzanis, C. et al., "Nonlinear optics in composite materials," in Progress in Optics XXIX, Elsevier Science Publishers B.V., pp. 323-425 (1991).

Frazao, O. et al., "EDFA gain flattening using long-period fibre gratings based on the electric arc technique," Proc. London Comm. Symp. 2001, London, England, 3 pages (2001).

Fujii, M. et al., "1.54 μm photoluminescence of $Er^{3+}$ doped into $SiO_2$ films containing Si nanocrystals: evidence for energy transfer from Si nanocrystals for $Er^{3+}$," Appl. Phys. Lett. 71(9): 1198-1200 (1997).

Garcia, C. et al., "Size dependence of lifetime and absorption cross section of Si nanocrystals embedded in $SiO_2$," Appl. Phys. Lett. 82(10): 1595-1597 (2003).

Goossens, A. et al., "Sensitization of $TiO_2$ with p-type semiconductor polymers," Chem. Phys. Lett. 287: 148 (1998).

Greene, J.E. et al., "Morphological and electrical properties of rf sputtered $Y_2O_3$-doped $ZrO_2$ thin films," J. Vac. Sci. Tech. 13(1): 72-75 (1976).

Han, H.-S. et al., "Optical gain at 1.54 μm in Erbium-doped Silicon nanocluster sensitized waveguide," Appl. Phys. Lett. 79(27): 4568-4570 (2001).

Hayakawa, T. et al., "Enhanced fluorescence from $Eu^{3+}$ owing to surface plasma oscillation of silver particles in glass," J. Non-Crystalline Solids 259: 16-22 (1999).

Hayakawa, T. et al., "Field enhancement effect of small Ag particles on the fluorescence from $Eu^{3+}$-doped $SiO_2$ glass," Appl. Phys. Lett. 74(11): 1513-1515 (1999).

Hayfield, P.C.S., I Development of a New Material-Monolithic $Ti_4O_7$ Ebonix® Ceramic, Royal Society of Chemistry, Cambridge, Table of Contents, 4 pages (2002).

Hehlen, M.P. et al., "Spectroscopic properties of $Er^{3+}$- and $Yb^{3+}$-doped soda-lime silicate and aluminosilicate glasses," Physical Review B 56(15): 9302-9318 (1997).

Hehlen, M.P. et al., "Uniform upconversion in high-concentration $Er^{3+}$-doped soda lime silicate and aluminosilicate glasses," Optics Letters 22(11); 772-774 (1997).

Horst, F. et al., "Compact, tunable optical devices in silicon-oxynitride waveguide technology," Top. Meeting Integrated Photonics Res. '00, Quebec, Canada, p. IThF1, 3 pages (2000).

Howson, R.P., "The reactive sputtering of oxides and nitrides," Pure & Appl. Chem. 66(6): 1311-1318 (1994).

Hubner, J. and Guldberg-Kjaer, S., "Planar Er- and Yb-doped amplifiers and lasers," COM Technical University of Denmark, $10^{th}$ European Conf. on Integrated Optics, Session WeB2, pp. 71-74 (2001).

Hwang et al., "Characterization of sputter-deposited LiMn2O4 thin films for rechargeable microbatteries," 141(12) J. Electrochem. Soc. 3296-99 (1994).

Hwang, M-S. et al., "The effect of pulsed magnetron sputtering on the properties of iridium tin oxide thin films," Surface and Coatings Tech. 171: 29-33 (2003).

Im, J.S. and Sposili, R.S., "Crystalline Si films for integrated active-matrix liquid crystal displays," MRS Bulletin, pp. 39-48 (1996).

Im, J.S. et al., "Controlled super-lateral growth of Si-films for microstructural manipulation and optimization," Physica Status Solidi (A) 166(2): 603-617 (1998).

Im, J.S. et al., "Single-crystal Si films for thin-film transistor devices," Appl. Physics Lett. 70(25): 3434-3436 (1997).

Itoh, M. et al., "Large reduction of singlemode-fibre coupling loss in 1.5% Δ planar lightwave circuits using spot-size converters," Electronics Letters 38(2): 72-74 (2002).

Jackson, M.K. and Movassaghi, M., "An accurate compact EFA model," Eur. Conf. Optical Comm., Munich, Germany, 2 pages (2000).

Janssen, R. et al., "Photoinduced electron transfer from conjugated polymers onto nanocrystalline $TiO_2$," Synthet. Metal., 1 page (1999).

Johnson, J.E. et al., "Monolithically integrated semiconductor optical amplifier and electroabsorption modulator with dual-waveguide spot-size converter input," IEEE J. Selected topics in Quantum Electronics 6(1): 19-25 (2000).

Jonsson, L.B. et al., "Frequency response in pulsed DC reactive sputtering processes," Thin Solid Films 365: 43-48 (2000).

Kato, K. and Inoue, Y., "Recent progress on PLC hybrid integration," SPIE 3631: 28-36 (1999).

Kato, K. and Tohmori, Y., "PLC hybrid integration technology and its application to photonic components," IEEE J. Selected Topics in Quantum Electronics 6(1): 4-13 (2000).

Kelly, P.J. and Arnell, R.D., "Control of the structure and properties of aluminum oxide coatings deposited by pulsed magnetron sputtering," J. Vac. Sci. Technol. A 17(3): 945-953 (1999).

Kelly, P.J. et al., "A novel technique for the deposition of aluminum-doped zinc oxide films," Thin Solid Films 426(1-2): 111-116 (2003).

Kelly, P.J. et al., "Reactive pulsed magnetron sputtering process for alumina films," J. Vac. Sci. Technol. A 18(6): 2890-2896 (2000).

Kik, P.G. and Polman, A., "Gain limiting processes in Er-doped Si nanocrystal waveguides in $SiO_2$," J. Appl. Phys. 91(1): 536-536 (2002).

Kim et al., "Correlation Between the Microstructures and the Cycling Performance of $RuO_2$ Electrodes for Thin-Film Microsupercapacitros," J. Vac. Sci. Technol. B20(5): 1827-1832 (Sep. 2002).

Kim, D-W. et al. "Mixture Behavior and Microwave Dielectric Properties in the Low-fired $TiO_2$-CuO System," Jpn. J. Appl. Phys. 39:2696-2700 (2000).

Kim, H-K. et al., "Characteristics of rapid-thermal-annealed LiCoO2 cathode film for an all-solid-state thin film microbattery," J. Vac. Sci. Technol. A 22(4): 1182-1187 (2004).

Kim, J-Y. et al. "Frequency-dependent pulsed direct current magnetron sputtering of titanium oxide films," J. Vac. Sci. Technol. A 19(2):429-434 (2001).

Ladouceur, F. and Love, J.D., in: Silica-based Buried Channel Waveguides and Devices, Chapman & Hall, London, Table of Contents, 6 pages (1996).

Ladouceur, F. et al., "Effect of side wall roughness in buried channel waveguides," IEEE Proc. Optoelectron. 141(4):242-248 (1994).

Lamb, W. and Zeiler, R., Designing Non-Foil Containing Skins for Vacuum Insulation Panel (VIP) Application, Vuoto XXVIII(1-2):55-58 (1999).

Lamb, W.B., "Designing Nonfoil Containing Skins for VIP Applications," DuPont VIA Symposium Presentation, 35 Pages (1999).

Lange, M.R. et al, "High Gain Ultra-Short Length Phosphate glass Erbium-Doped Fiber Amplifier Material," OSA Optical Fiber Communications (OFC), 3 Pages (2002).

Laporta, P. et al, "Diode-pumped cw bulk Er: Yb: glass laser," Optics Letters 16(24):1952-1954 (1991).

Laurent-Lund, C. et al., "PECVD Grown Mulitple Core Planar Wageguides with Extremely Low Interface Reflections and Losses," IEEE Photonics Tech. Lett. 10(10):1431-1433 (1998).

Lee, B.H. et al., "Effects of interfacial layer growth on the electrical characteristics of thin titanium oxide films on silion," Appl. Phys. Lett. 74(21):3143-3145 (1999).

Lee, K.K. et al., "Effect of size and roughness on light transmission in a Si/SiO$_2$ waveguide: Experiments and model," Appl. Phys. Lett. 77(11):1617-1619 (2000).

Love, J.D. et al., "Quantifying Loss Minimisation in Single-Mode Fibre Tapers," Electronics Letters 22(17):912-914 (1986).

Mardare, D. and Rusu, G.I., "On the structure of Titanium Oxide Thin Films," Andalele Stiintifice Ale Universitatii IASI, Romania, pp. 201-208 (1999).

Marques, P.V.S. et al., "Planar Silica-on-Silicon Waveguide Lasers Based in Two Layers Core Devices," 10th European Conference on Integrated Optics, Session WeB2, pp. 79-82 (2001).

Meijerink, A. et al, "Luminescence of Ag$^+$ in Crystalline and Glassy Srb$_4$O$_7$," J. Physics Chem. Solids 54(8):901-906 (1993).

Mesnaoui, M. et al, "Spectroscopic properties of Ag$^+$ ions in phosphate glasses of NaPO$_3$-AgPO$_3$ system," Eur. J. Solid State Inorg. Chem. 29:1001-1013 (1992).

Mitomi, O. et al., "Design of a Single-Mode Tapered Waveguide for Low-Loss Chip-to-Fiber Coupling," IEEE J. Quantum Electronics 30(8): 1787-1793 (1994).

Mizuno, Y. et al "Temperature dependence of oxide decomposition on titanium surfaces in UHV," J. Vac. Sci & Tech. A. 20(5): 1716-1721 (2002).

Ohkubo, H. et al., Polarization-Insensitive Arrayed-Waveguide Grating Using Pure SiO$_2$ Cladding, Fifth Optoelectronics and Communication Conference (OECC 2000) Technical Digest, pp. 366-367 (2000).

Ohmi, S. et al., "Rare earth mental oxides for high-K fate insulator," VLSI Design 2004, 1 Page (2004).

Ohtsuki, T., et al., "Gain Characteristics of high concentration Er$^{3+}$-doped phosphate glass waveguide," J. Appl. Phys. 78(6):3617-3621 (1995).

Ono, H. et al., "Design of a Low-loss Y-branch Optical Waveguide," Fifth Optoelectronic and Communications Conference (OECC 2000) Technical Digest, pp. 502-503 (2000).

Padmini, P. et al. "Realization of High Tunability Barium Strontium Titanate Thin Films by rf Megnetron Sputtering," Appl. Phys. Lett. 75(20):3186-3188 (1999).

Pan, T. et al., "Planar Er$^{3+}$-doped aluminosilicate waveguide amplifier with more than 10 dB gain across C-band, " Optical Society of America, 3 pages (2000).

Park et al., "Characteristics of Pt Thin Film on the Conducting Ceramics TiO and Ebonex (Ti$_4$O$_7$) as Electrode Materials," Thin Solid Films 258: 5-9 (1995).

Peters, D.P. et al., "Formation mechanism of silver nanocrystals made by ion irradiation of Na$^+$—Ag$^+$ ion-exchanged sodalime silicate glass," Nuclear Instruments and Methods in Physics Research B 168:237-244 (2000).

Rajarajan, M. et al., "Numerical Study of Spot-Size Expanders fro an Efficient OEIC to SMF Coupling," IEEE Photonics Technology Letters 10(8): 1082-1084 (1998).

Ramaswamy, R.V. et al., "Ion-Exchange Glass Waveguides: A Review," J. Lightwave Technology 6(6): 984-1002 (1988).

Roberts, S.W. et al., "The Photoluminescence of Erbium-doped Silicon Monoxide," University of Southampton , Department of Electronics and Computer Science Research Journal, 7 pages (1996).

Saha et al., "Large Reduction of Leakage Current by Graded-Layer La Doping in (Ba0.5,Sr0.5)TiO3 Thin Films," Appl. Phys. Lett. 79(1): 111-113 (Jul. 2001).

Sanyo Vacuum Industries Co., Ltd. Products Infor, TiO$_2$, (2003), 1 page, http://www.sanyovac.co.jp/Englishweb/products?ETiO2.htm.

Schermer, R. et al., "Investigation of Mesa Dielectric Waveguides," Proceedings of the OSA Integrated Photonics Research Topical Meeting and Exhibit, Paper No. IWB3, 3 pages (2001).

Schiller, S. et al., "PVD Coating of Plastic Webs and Sheets with High Rates on Large Areas," European Materials Research Society 1999 Spring Meeting, Jun. 1-4, 1999, Strasbourg, France, 13 pages (1999).

Scholl, R., "Power Supplies for Pulsed Plasma Technologies: State-of-the-Art and Outlook," Advances Energy Industries, Inc. 1-8 (1999).

Scholl, R., "Power Systems for Reactive Sputtering of Insulating Films," Advances Energy Industries, Inc., 1-8 (Aug. 2001).

Second International Symposium of Polymer Surface Modification: Relevance to Adhesion, Preliminary Program, 13 pages (1999).

Seventh International Conference on TiO$_2$ Photocatalysis: Fundamentals & Applications, Toronto, Ontario, Canada, Final Program, 7 pages (Nov. 17-21, 2002).

Sewell, P. et al., "Rib Waveguide Spot-Size Transformers: Modal Properties," J Lightwave Technology 17(5):848-856 (1999).

Shaw, D.G. et al., "Use of Vapor Deposited Acrylate Coatings to Improve the Barrier Properties of Metallized Film," Society of Vacuum Coaters, 37th Annual Technical Conference Proceedings, pp. 240-244 (1994).

Shin, J.C. et al. "Dielectric and Electrical Properties of Sputter Grown (Ba,Se)TiO$_3$ Thin Films," J. Appl. Phys. 86(1):506-513 (1999).

Shmulovich, J. et al., "Recent progress in Erbium-doped waveguide amplifiers," Bell Laboratories, pp. 35-37 (1999).

Slooff, L.H. et al., "Optical properties of Erbium-doped organic polydentate cage complexes," J. Appl. Phys. 83(1):497-503 (1998).

Smith, R.E. et al., "Reduced Coupling Loss Using a Tapered-Rib Adiabatic-Following Fiber Coupler," IEEE Photonics Technology Lett. 8(8):1052-1054 (1996).

Snoeks, E. et al., "Cooperative upconversion in erbium-implanted soda-lime silicate glass optical waveguides," J. Opt. Soc. Am. B 12(8): 1468-1474 (1995).

Strohhofer, C. and Polman, A. "Energy transfer to Er$^{3+}$ in Ag ion-exchanged glass," FOM Institute for Atomic and Molecular Physics, 10 pages (2001).

Sugiyama, A. et al., "Gas Permeation Through the Pinholes of Plastic Film Laminated with Aluminum Foil," Vuoto XXVIII(1-2):51-54 (1999).

Tervonen, A. "Challenges and opportunities for integrated optics in optical networks," SPIE 3620:2-11 (1999).

Ting, C.Y. et al., "Study of planarized sputter-deposited SiO$_2$," J. Vac. Sci Technol, 15(3):1105-1112 (1978).

Tomaszewski, H. et al., "Yttria-stabilized zirconia thin films grown by reactive r.f. magnetron sputtering," Thin Solid Films 287: 104-109 (1996).

Triechel, O. and Kirchhoff, V., "The influences of pulsed magnetron sputtering on topography and crystallinity of TiO$_2$ films on glass," Surface and Coating Technology 123:268-272 (2000).

Tukamoto, H. And West, A.R., "Electronic Conductivity of LiCoO$_s$ and Its Enhancement by Magnesium Doping," J. Electrochem. Soc 144(9):3164-3168 (1997).

Van Dover, R.B., "Amorphous Lanthanide-Doped TiO$_x$ Dielectric Films," Appl. Phys. Lett. 74(20):3041-3043 (1999).

Viljanen, J. and Leppihalme, M., "Planner Optical Coupling Elements for Multimode Fibers with Two-Step Ion Migration Process," Applied Physics 24(1):61-63 (1981).

Villegas, M.A. et al., "Optical spectroscopy of a soda lime glass exchanged with silver," Phys. Chem. Glasses 37(6):248-253 (1996).

Von Rottkay, K. et al., "Influences of stoichiometry on electrochromic cerium-titanium oxide compounds," Presented at the 11th Int'l Conference of Solid State Ionics, Honolulu, Hawaii, Nov. 19, 1997, Published in Solid State Ionics 113-115:425-430. (1998).

Wang, B. et al., "Characterization of Thin-Film Rechargeable Lithium Batteries with Lithium Cobalt Oxide Cathodes," J. Electrochem. Soc. 143:3203-13 (1996).

Westlinder, J. et al., "Simulations and Dielectric Characterization of Reactive dc Magnetron Cosputtered (Ta$_2$O$_5$)$_{1-x}$(TiO$_2$)$_x$ Thin Films," J Vac. Sci. Technol. B 20(3):855-861 (May/Jun. 2002).

Wilkes, K.E., "Gas Permeation Through Vacuum Barrier Films and its Effect on VIP Thermal Performance," presented at the Vacuum Insulation Panel Symp., Baltimore, Maryland, 21 pages (May 3, 1999).

Yanagawa, H. et al., "Index-and-Dimensional Taper and Its Application to Photonic Devices," J. Lightwave Technology 10(5):587-591 (1992).

Yoshikawa, K. et al., "Spray formed aluminum alloys for sputtering targets," Powder Metallurgy 43(3): 198-199 (2000).

Zhang, H. et al., "High Dielectric Strength, High k TiO$_2$ Films by Pulsed DC, Reactive Sputter Deposition," 5 pages (2001).

Jones and Akridge, "A thin film solid state microbattery," Solid State Ionics 53-56 (1992), pp. 628-634.

Abraham, K.M. et al., "Inorganic-organic composite solid polymer electrolytes," 147(4) J. Electrochem. Soc. 1251-56 (2000).

Abrahams, I., "Li$_6$Zr$_2$O$_7$, a new anion vacancy ccp based structure, determined by ab initio powder diffraction methods," 104 J. Solid State Chem. 397-403 (1993).

Amatucci, G. et al., "Lithium scandium phosphate-based electrolytes for solid state lithium rechargeable microbatteries," 60 Solid State Ionics 357-65 (1993).

Appetecchi, G.B. et al., "Composite polymer electrolytes with improved lithium metal electrode interfacial properties," 145(12) J. Electrochem. Soc. 4126-32 (1998).

Bates, J.B. et al., "Electrical properties of amorphous lithium electrolyte thin films," 53-56 Solid State Ionics 647-54 (1992).

Delmas, C. et al., "Des conducteurs ioniques pseudo-bidimensionnels Li$_8$MO$_6$ (M =Zr, Sn), Li$_7$LO$_6$ (L =Nb, Ta) et Li$_6$In$_2$O$_6$," 14 Mat. Res. Bull. 619-25 (1979).

Hu, Y-W. et al., "Ionic conductivity of lithium phosphate-doped lithium orthosilicate," 11 Mat. Res. Bull. 1227-30 (1976).

Neudecker, B. et al., "Li$_9$SiAlO$_8$: a lithium ion electrolyte for voltages above 5.4 V," 143(7) J. Electrochem. Soc. 2198-203 (1996).

Ohno, H. et al., "Electrical conductivity of a sintered pellet of octalithium zirconate," 132 J. Nucl. Mat. 222-30 (1985).

Scholder, V. et al., "Über Zirkonate, Hafnate und Thorate von Barium, Strontium, Lithium und Natrium," Zeitschrift für Anorganische und Allgemeine Chemie, Band 362, pp. 149-168 (1968).

Yu, X. et al., "A stable thin-film lithium electrolyte: lithium phosphorus oxynitride," 144(2) J. Electrochem. Soc. 524-532 (1997).

Dobkin, D.M., "Silicon Dioxide: Properties and Applications".

Hwang et al., "Characterization of Sputter-Deposited LiMn$_2$O$_4$ Thin Films for Rechargeable Microbatteries," 141(12) J. Electrochem. Soc. 3296-99 (1994).

Jones et al., 53-56 Solid State Ionics 628 (1992).

Mattox "Handbook of Physical Vapor Deposition (PVD) Processing, Society of Vacuum Coaters," Albuquerque, New Mexico 660f and 692ff, Noyes Publications (1998).

Hill, R. et al., "Large Area Deposition by Mid-Frequency AC Sputtering," Society of Vacuum Coaters, 41$^{st}$ Annual Tech. Conference Proceedings, 197-202 (1998).

Macák, Karol et al, "Ionized Sputter Deposition Using an Extremely High Plasma Density Pulsed Magnetron Discharge," J. Vac. Sci, Technol. A 18(4):1533-37 (2000).

Balanis, Constantine A., "Antenna Theory: Analysis and Design," 3rd Ed., pp. 817-820 (John Wiley & Sons, Inc. Publication, 2005).

Inaguma, Yoshiyuki, "High Ionic Conductivity in Lithium Lanthanum Titanate," Solid State Communications, vol. 86, No. 10 pp. 689-93 (1993).

Guy, D., "Novel Architecture of Composite Electrode for Optimization of Lithium Battery Performance," Journal of Power Sources 157, pp. 438-442 (2006).

Wolfenstine, J., "Electrical Conductivity and Charge Compensation in Ta Doped Li$_4$Ti$_5$O$_{12}$," Journal of Power Sources 180, pp. 582-585 (2008).

Balanis, Constantine A., "Antenna Theory: Analysis and Design," 3rd Ed., pp. 811-820 (2005).

Affinito, J.D. et al., "PML/oxide/PML barrier layer performance differences arising from use of UV or electron beam polymerization of the PML layers," Thin Solid Films 308-309: 19-25 (1997).

Affinito, J.D. et al., "Polymer-oxide transparent barrier layers," Society of Vacuum Coaters, 39$^{th}$ Ann. Technical Conference Proceedings, May 5-10, 1996, Philadelphia, PA, pp. 392-397 (1996).

Alder, T. et al., "High-efficiency fiber-to-chip coupling using low-loss tapered single-mode fiber," IEEE Photonics Tech. Lett. 12(8): 1016-1018 (2000).

Almeida, V.R. et al., "Nanotaper for compact mode conversion," Optics Letters 28(15): 1302-1304 (2003).

Anh et al., "Significant Suppression of Leakage Current in (Ba,Sr)TiO$_3$ Thin Films by Ni or Mn Doping," J. Appl. Phys.,92(5): 2651-2654 (Sep. 2002).

Asghari, M. and Dawnay, E., "ASOC™—a manufacturing integrated optics technology," SPIE 3620: 252-262 (Jan. 1999).

Barbier, D. et al., "Amplifying four-wavelength combiner, based on erbium/ytterbium-doped waveguide amplifiers and integrated splitters," IEEE Photonics Tech. Lett. 9:315-317 (1997).

Barbier, D., "Performances and potential applications of erbium doped planar waveguide amplifiers and lasers," Proc. OAA, Victoria, BC, Canada, pp. 58-63 (Jul. 21-23, 1997).

Bates et al., "Thin-Film Lithium Batteries" in New Trends in Electrochemical Technology: Energy Storage Systems for Electronics (T. Osaka & M. Datta eds. Gordon and Breach 2000).

Beach R.J., "Theory and optimization of lens ducts," Applied Optics 35(12): 2005-2015 (1996).

Inaguma, Yoshiyuki, "High Ionic Conductivity in Lithium Lanthanum Titanate," Solid State Communications,vol. 86, No. 10, pp. 689-693 (1993).

Sarro, P., "Silicon Carbide as a New MEMS Technology," Sensors and Actuators 82, 210-218 (2000).

Extended European Search Report issued in related European Application Serial No. 097013359.3, dated Jul. 23, 2012.

* cited by examiner

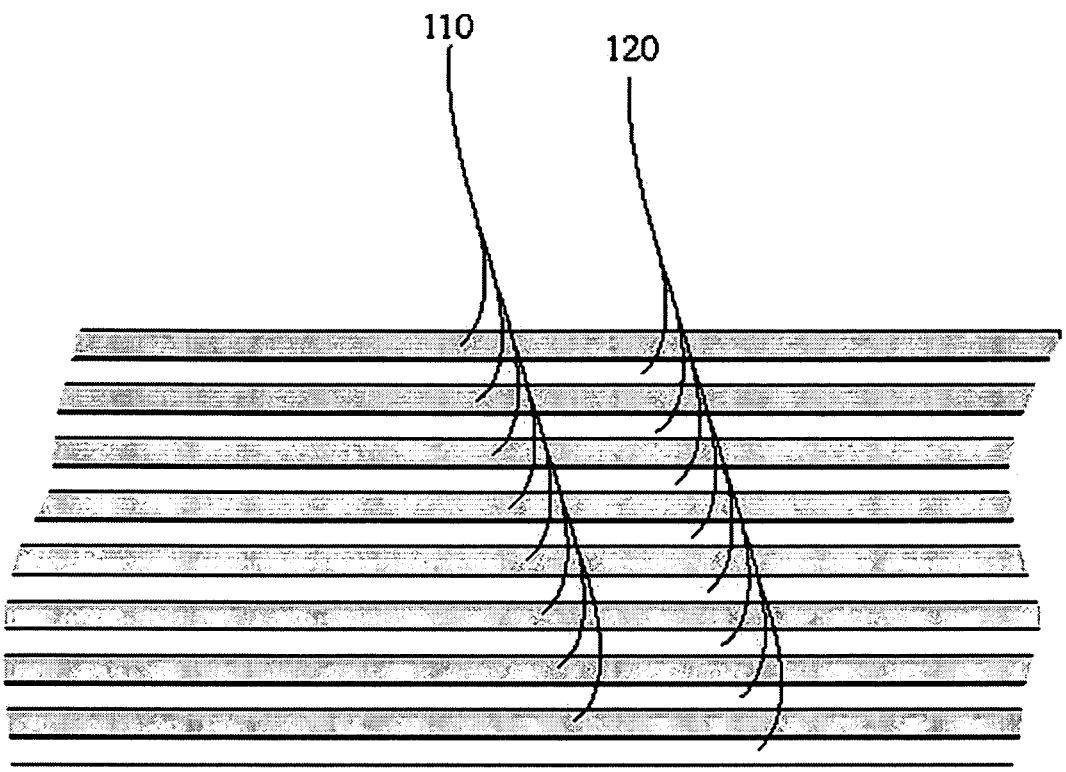

THIN FILM ENCAPSULATION FOR THIN FILM BATTERIES AND OTHER DEVICES

RELATED APPLICATION(S)

The present application claims priority under 35 U.S.C. §119 to U.S. provisional patent application Ser. No. 61/020,506, filed Jan. 11, 2008, which is incorporated herein by reference in its entirety.

FIELD OF THE INVENTION

The field of this invention is the device, composition, method of depositing, encapsulation and fabrication of solid-state, thin-film, secondary and primary electrochemical devices, including batteries.

BACKGROUND OF THE INVENTION

Thin-film batteries (TFBs) typically may require a high-performance hermetic encapsulation that protects them against ambient chemical reactants (such as, for example, $O_2$, $H_2O$, $N_2$, $CO_2$, etc.) over many years of life time. The quality requirements for the encapsulation may be independent of the material choice of the most sensitive component in a thin-film battery, the anode (metallic lithium, lithium-ion [e.g. carbon or tin nitride], or "Li-free" anode [=current collector at which metallic lithium is plated out during TFB operation]), because any of these anodes may cease to work after a comparable amount of long-term, accumulated transmission of reactants into the TFB. For a 10-year shelf-life expectancy, for instance, the encapsulation should preferably exhibit a water vapor transmission rate (WVTR) of less than $10^{-3}$ $g/m^2$-day while the oxygen transmission rate (OTR) should preferably be smaller than $5 \times 10^{-4}$ $g/m^2$-day. These estimated quantities are based on the complete reaction of $1.6 \times 10^{-4}$ $g/cm^2$ of lithium metal or lithium ions in the anode to either LIOH or $Li_2O$. Furthermore, these estimated quantities represent practical rates and include reactants ingress (transmission) along the encapsulation-TFB seal area, in addition to the typical transmission rates that are measured only vertically through the encapsulation by the MOCON method.

However, current non-thin-film encapsulation is generally responsible for nearly 50% or more of the overall thickness of standard TFBs. When adjoining TFBs into a battery stack for applications for which the supply of a maximum of energy within a given thickness is critical, one can not afford to waste 50% of the stack volume on non-energy providing encapsulation.

Thus, a need exists for the encapsulation thickness to be reduced to a minimum without compromising the protection performance.

SUMMARY OF THE INVENTION

The invention pertains to, for example, a high-performance thin-film encapsulation for devices such as thin-film batteries that allows for the encapsulated devices to be fabricated much thinner than before while substantially increasing their high-temperature stability. The described approach is based on a multilayer thin-film encapsulation whose constituent sub-units comprise, for example, alternating metal getter/metal nitride diffusion blocker sub-layers, which are substantially impenetrable by oxygen and moisture.

In one embodiment, the encapsulated device is a thin-film battery with a cathode of a thickness that is greater than about 0.5 μm and less than about 200 μm. The electrolyte may be less than, for example, about 5 μm thick. The anode may be greater than, for example, about 0.1 μm and less than 30 μm thick. Also, the encapsulating layer may have alternating metal sub-layers and ceramic, blocking sub-layers which may each be at least about 500 angstroms thick. Furthermore, the alternating metal and ceramic blocking sub-layers may, for instance, comprise at least two blocking sub-layers and two metal sub-layers. Finally, in at least one embodiment, the total thickness of every metal sub-layer and every ceramic blocking sub-layer combined may be less than about 5 μm.

In another embodiment, the encapsulated device is a battery and employs the battery-type and thin-film encapsulation described in the previous paragraph and stacks a plurality of cells. A total thickness for a five-cell stack may preferably be generally less than about 0.5 mm.

BRIEF DESCRIPTION OF FIGURE

FIG. 1 shows a section of a multilayer thin film used to encapsulate an electrochemical device according to an embodiment of the present invention.

DETAILED DESCRIPTION

FIG. 1 shows a section of a multilayered thin film used to encapsulate an electrochemical device according to one embodiment of the present invention. The thin encapsulation material may comprise, for example, multiple strong metallic getter sub-layers 110 with alternating amorphous or glassy oxide or nitride ceramic blocking sub-layers 120. The strong metallic getter sub-layers 110 may be used, for example, to protect the device from moisture and oxygen. The strong metallic sub-layers may, for example, be comprised of Zr, Y, Ti, Cr, Al, or any alloy thereof. The amorphous or glassy ceramic blocking sub-layers 120 may be oxides, nitrides, carbides, silicides, or borides of the metal or metals used in the getter sub-layers, such as, for example, $ZrO_2$, ZrN, ZrC, $ZrB_2$, ZrSi, $Y_2O_3$, YN, YC, $YB_6$, YSi, $TiO_2$, TiN, TiC, $TiB_2$, TiSi, $Cr_2O_3$, CrN, $Cr_3C_2$, $CrB_2$, CrSi, $Al_2O_3$, AlN, $Al_4C_3$, $AlB_2$, $Al_4Si_3$, or any multi-element compound thereof. The amorphous or glassy sub-layers of these rather covalently bonded materials are typically densely packed arrangements of the constituent atoms while allowing very limited or no diffusion of moisture or oxygen through their bulk. As a result, this multilayered thin film may effectively block, for example, any moisture or oxygen diffusion through its bulk and along its interfaces and may also protect the underlying, air sensitive metallic anode. Furthermore, the sub-layers may have a combined thickness that is sufficient to frustrate oxygen and moisture penetration.

Among certain available materials, a layer of metal (sheet, foil, or thin films) may provide the most efficient protection against oxygen and moisture, particularly when the metal can be hermetically sealed around the environmentally-sensitive body. Specifically, for the protection of thin-film devices it would be most preferable to apply a metallic thin film encapsulation that creates a tent-like construction over a device having a substrate and attaching the encapsulation to the substrate along a surface next to the device in a tightly-sealed fashion.

The optimized encapsulation approach specifically designed for TFBs consists of a multilayer construction formed by a plurality of thin metal sub-layers with alternating amorphous or glassy inorganic oxide and/or nitride and/or carbides, and/or silicides, and/or borides sub-layers that exhibit little or no grain structure. In particular, certain "grainless" nitrides, carbides, silicides, and borides possess very dense material morphologies that effectively block the diffusion paths for any oxygen and/or moisture that may have penetrated the neighboring thin metal sub-layers.

In an embodiment in the present invention, metals may be chosen from well known $O_2$ and/or $H_2O$ getters, such as Zr, Y, Ti, Cr, Al, and/or alloys thereof. The diffusion blocking, inorganic amorphous or glassy sub-layers may be selected from materials such as $ZrO_2$, ZrN, $Y_2O_3$, YN, $Cr_2O_3$, CrN, $Al_2O_3$, AlN, and/or multinary compound compositions and derivatives thereof, such as $TiAlN_xO_y$.

These thin-film encapsulation sub-layers can be deposited by, for example, metal sputtering with alternating compound deposition using one single sputter cathode in one vacuum deposition chamber without sample change. This may be performed by simply switching back and forth between Ar and Ar—$N_2$—$O_2$ sputtering of the same metal (e.g., TiAl). The result may be a 3 μm thick, 30-layer construction of 0.1 μm TiAl/0.1 μm $TiAlN_xO_y$/0.1 μm TiAl/0.1 μm $TiAlN_xO_y$/ . . ., which may be difficult for $O_2$ and $H_2O$ to penetrate or permeate in vertical direction. To avoid compromising this high-performance encapsulation through seal leaks at the encapsulation-substrate interface (seal area), specific attention may be given to the substantially defect-free deposition of these layers in the seal area. This objective may be accomplished through an appropriately prepared substrate surface and a substantially flawless thin-film layer deposition.

This type of multilayer thin-film encapsulation embodiment may not only preferably be about 3 μm thin (reduces the thickness of the TFB from 150 μm to about 80 μm) but may also be as substantially flexible as any of the other battery component layers, such as the 3 μm $LiCoO_2$ cathode. Fine-tuning of the flexibility of the multilayer thin-film encapsulation may be achieved through a change in physical vapor deposition (PVD) parameters and/or change in materials selection, such as resorting to Zr/ZrN/Zr/Zr$_2$N/Zr/Zr$_x$N/Zr . . . instead of TiAl/$TiAlN_xO_y$/TiAl/ . . . .

A metallic lithium anode is chemically stable with, for instance, Zr and/or ZrN. However, the metallic lithium anode can be soft and, as it is known of most anode materials today, may be susceptible to substantial expansion and contraction during TFB operation. Mechanical features such as these can be challenging for the multilayer thin-film encapsulation, potentially causing cracks due to stress imbalance at the lithium anode/encapsulation interface. Once the encapsulation is cracked, the underlying lithium anode may be exposed to air and thus may chemically deteriorate.

To counteract this stress imbalance, a stress modulating layer, such as a thin-film layer of Lipon, may be introduced between the metallic lithium anode and the multilayer thin-film encapsulation. Lipon has been proven to be chemically and mechanically stable with TiAl, $TiAlN_xO_y$, Zr, ZrN, etc., as well as with lithium alloys, lithium solid solutions, and metallic lithium. The Lipon electrolyte layer that is located underneath the metallic lithium anode, together with the overlying Lipon stress modulation layer, can confine the interposed metallic lithium anode while protecting it, not only mechanically but also chemically, as Lipon is compatible with metallic lithium. In this configuration where the metallic lithium anode is confined with in the layers of Lipon, it may remain fixed within its location and electrochemically intact even when heated above its melting point of 181° C. This engineering design of some embodiments utilizing this configuration may enable the TFB to be used in solder reflow or flip chip processing. Aided through this design, the multilayer thin-film encapsulation does not only provide the TFB with much less thickness but also with a much higher temperature stability (>150° C. continuous) than the surlyn/metal foil encapsulation currently used in industry.

In other embodiments, alloys or solid solutions of lithium (e.g. $Li_xCu$, $Li_xZr$, $Li_xV$, $Li_xW$), which electrochemically behave very similar to a metallic lithium anode, may be used as the anode, offering stronger mechanical properties compared to the soft lithium anode, thereby allowing the direct deposition of the multilayer thin-film encapsulation without the use of the Lipon stress modulation layer. The resulting multilayer thin-film encapsulation may still allow the TFB to maintain a high temperature stability (>150° C. continuous), just as the one configured with the Lipon stress modulation layer.

Once the multilayer thin-film encapsulation in certain embodiments is demonstrated to be chemically and mechanically stable with the metallic lithium anode, or lithium alloy, under TFB operation, the present invention in certain embodiments may deposition-pattern the multilayer thin-film encapsulation in a fashion that renders it selectively conducting and insulating in other areas. This way, the multilayer thin-film encapsulation can also serve as the anode current collector, or negative terminal, without short-circuiting the TFB through the metallic substrate, which is configured as the positive terminal in IPS' TFBs fabricated on metal foil.

EXAMPLES OF EMBODIMENTS

Example 1

Some embodiments use the encapsulation method described to protect a lithium anode from moisture and air. These embodiments comprise a 1 in² metal foil substrate measuring approximately 50 μm in thickness. A 0.5 μm thick conductive barrier layer is disposed on at least one surface of the substrate using one of the methods generally available to one ordinarily skilled in the art in addition to those described here. A 3.5 μm thick $LiCoO_2$ positive cathode is disposed onto the conductive barrier layer. A 1.2 μm thick Lipon electrolyte layer is disposed onto the cathode layer and a 9 μm thick Li anode is disposed onto the electrolyte. A 3 μm thick thin-film multilayer encapsulation, consisting of 15 sub-layers of 0.1 μm Zr alternated with 15 sub-layers of 0.1 μm of ZrN, is then disposed on the layered device. This specific embodiment can achieve 500 h in 85° C./85% RH environment.

Example 2

Other embodiments may combine five of the encapsulated battery cells discussed previously. This embodiment generally has a total thickness less than 0.5 mm and supplies 2.5 mAh at ½ C rate at 25° C. between 4.2-2.0V.

Example 3

Yet other embodiments of the present invention comprise a 0.5 μm conductive barrier layer, a $LiCoO_2$ positive cathode with a thickness of about 12 μm, a 1.2 μm Lipon electrolyte layer, a Li anode with a thickness of about 10 μm, and a 2 μm thick Lipon modulator layer on top of the Li anode. These embodiments may be fabricated on a 50 μm metal foil substrate of 1 in² in area and encapsulated by a 3 μm thin-film encapsulation. This embodiment has a total thickness of less than 80 μm and generally supplies 2 mAh at ½ C rate at 25° C. between 4.2-2.0V.

Example 4

Further, other embodiments of the present invention may comprise the electrochemical device from Example 1. Due to the high-melting point of Zr—ZrN (>>1000° C.), the encapsulation is capable of withstanding temperatures of up to 265° C.—the maximum temperature encountered in lead-free solder reflow processing—for extended periods of time. This chemical and physical stability of the electrochemical device is achieved despite the melting of the metallic lithium anode that does, however, not react with Zr or ZrN under these conditions.

Example 5

Yet, other embodiments of the present invention comprise a selectively conductive encapsulation wherein, through thin-film deposition patterning such as may be accomplished by shadow-masking, certain areas of the encapsulation are made electrically conductive while some others are fabricated electrically insulating. The electrically conductive areas comprise metallic sub-layers and/or electrically conductive ceramic sub-layers while the electrically insulating areas comprise ceramic non-conducting sub-layers, such as, for instance $ZrO_2$. The selectively conductive encapsulation allows it to be used as an electrical terminal of the electrochemical device.

It is to be understood that the present invention is not limited to the particular methodology, compounds, materials, manufacturing techniques, uses, and applications described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

All patents and other publications identified are incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason.

The embodiments described above are exemplary only. One skilled in the art may recognize variations from the embodiments specifically described here, which are intended to be within the scope of this disclosure. As such, the invention is limited only by the following claims. Thus, it is intended that the present invention cover the modifications of this invention provided they come within the scope of the appended claims and their equivalents. Further, specific explanations or theories regarding the formation or performance of electrochemical devices according to the present invention are presented for explanation only and are not to be considered limiting with respect to the scope of the present disclosure or the claims.

What is claimed is:

1. An electrochemical device comprising:
   an environmentally sensitive layer; and
   a thin encapsulation layer deposited over said sensitive layer, comprising a plurality of alternating metallic sub-layers and ceramic sub-layers,
   wherein at least one area of said thin encapsulation layer corresponding to the environmentally sensitive layer is selectively conductive and another area is insulating.

2. The electrochemical device of claim 1 wherein said metallic sub-layers comprise at least one element selected from the group comprising: scandium, yttrium, lanthanum, titanium, zirconium, hafnium, vanadium, niobium, tantalum, chromium, molybdenum, tungsten, manganese, iron, cobalt, nickel, copper, zinc, boron, aluminum, carbon, silicon, germanium, beryllium, magnesium, calcium, strontium, barium, lithium, sodium, potassium, rubidium, and caesium.

3. The electrochemical device of claim 1 wherein said ceramic sub-layers comprise nitrides of at least one element selected from the group comprising: scandium, yttrium, lanthanum, titanium, zirconium, hafnium, vanadium, niobium, tantalum, chromium, molybdenum, tungsten, manganese, iron, cobalt, nickel, copper, zinc, boron, aluminum, carbon, silicon, germanium, beryllium, magnesium, calcium, strontium, barium, lithium, sodium, potassium, rubidium, and caesium.

4. The electrochemical device of claim 1 wherein said environmentally sensitive layer comprises at least one material selected from the group consisting of: lithium alloy, lithium solid solution, metallic lithium, titanium, vanadium, chromium, manganese, iron, cobalt, nickel, copper, zinc, zirconium, niobium, molybdenum, palladium, silver, hafnium, tantalum, tungsten, iridium, platinum, gold, beryllium, magnesium, calcium, strontium, barium, boron, aluminum, indium, carbon, silicon, germanium, tin, lead, phosphorus, arsenic, antimony, and bismuth.

5. The electrochemical device of claim 1 further comprising a stress modulation layer disposed between said environmentally sensitive layer and said encapsulation layer.

6. The electrochemical device of claim 5 wherein said stress modulation layer is not reactive with either said environmentally sensitive layer or said thin encapsulation layer.

7. The electrochemical device of claim 5 where said stress modulation layer comprises Lipon.

8. The electrochemical device of claim 1 where said environmentally sensitive layer is soft.

9. The electrochemical device of claim 8 wherein said soft, environmentally sensitive layer comprises of at least one material selected from the group consisting of: lithium alloy, lithium solid solution, and metallic lithium.

10. The electrochemical device of claim 1 wherein at least one sub-layer of said encapsulation layer is deposited using sputtering from a metallic target.

11. The electrochemical device of claim 1 wherein at least one sub-layer of said encapsulation layer is deposited using a dual sputter cathode deposition method.

12. The electrochemical device of claim 1 wherein said environmentally sensitive material comprises an anode.

13. The electrochemical device of claim 1 wherein said device maintains thermal stability under solder reflow conditions of up to 265° C.

14. The electrochemical device of claim 1 wherein said at least one area of selectively conductive thin encapsulation layer serves as one electrical terminal of said device.

15. The electrochemical device of claim 1 wherein said encapsulation layer is flexible.

16. The electrochemical device of claim 1 further comprising:
    a cathode;
    an electrolyte deposited on said cathode;
    an anode deposited on said electrolyte;
    a stress modulating layer deposited between said anode and said encapsulation layer.

17. The electrochemical device of claim 16 wherein said cathode comprises $LiCoO_2$.

18. The electrochemical device of claim 16 wherein said electrolyte comprises Lipon.

19. The electrochemical device of claim 16 wherein said anode comprises at least one material selected from the group consisting of: lithium alloy, lithium solid solution, and metallic lithium.

20. The electrochemical device of claim 16 wherein said stress modulating material comprises Lipon.

21. The electrochemical device of claim 16 wherein said cathode thickness is between about 0.5 μm and 200 μm.

22. The electrochemical device of claim 16 wherein said electrolyte thickness is less than about 5 μm.

23. The electrochemical device of claim 16 wherein said anode thickness is between about 0.1 μm and 30 μm.

24. The electrochemical device of claim 1 wherein said alternating metallic and blocking layers comprise at least two metallic sub-layers and at least two ceramic sub-layers, respectively.

25. The electrochemical device of claim 24 wherein the total thickness of every metallic layer and every ceramic layer is less than about 5 μm.

26. An electrochemical device comprising:
    a cathode;
    an electrolyte deposited on said cathode;
    a soft, environmentally sensitive anode deposited on said electrolyte;
    a stress modulating layer deposited on said anode; and
    an encapsulation layer, comprising a plurality of alternating metallic and ceramic sub-layers, deposited on said modulating layer,
    wherein at least one area of said encapsulation layer corresponding to the anode is selectively conductive and another area is insulating.

27. An electrochemical device comprising:
    a cathode greater than about 0.5 μm and less than about 200 μm thick;
    an electrolyte less than about 5 μm thick;
    an anode greater than about 0.1 μm and less than about 30 μm thick;
    a modulating layer;
    a plurality of alternating metallic and ceramic sub-layers, wherein each sub-layer is less than about 5 μm thick; and
    wherein at least one area of said plurality of alternating metallic and ceramic sub-layers corresponding to the anode is selectively conductive and another area is insulating.

* * * * *